United States Patent
Dimitrov et al.

(10) Patent No.: US 12,506,605 B1
(45) Date of Patent: Dec. 23, 2025

(54) CONTROLLING ACCESS TO CRYPTOGRAPHIC RESOURCES USING OFFLINE STORAGE

(71) Applicant: Citibank, N.A., New York, NY (US)

(72) Inventors: Biser Dimitrov, New York, NY (US); Boaz Bechar, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/287,749

(22) Filed: Jul. 31, 2025

(51) Int. Cl.
H04L 29/06 (2006.01)
H04L 9/08 (2006.01)

(52) U.S. Cl.
CPC .................................. H04L 9/088 (2013.01)

(58) Field of Classification Search
CPC ...................................................... H04L 9/088
See application file for complete search history.

(56) References Cited

U.S. PATENT DOCUMENTS

2020/0403809 A1* 12/2020 Chan ................. G06F 16/27
2021/0084174 A1* 3/2021 Xu ...................... H04W 8/12

OTHER PUBLICATIONS

U.S. Appl. No. 19/287,718, filed Jul. 31, 2025, Controlling Access to Cryptographic Resources.
U.S. Appl. No. 19/287,737, filed Jul. 31, 2025, Controlling Access to Cryptographic Resources Using Double Encryption.

* cited by examiner

*Primary Examiner* — Evans Desrosiers
(74) *Attorney, Agent, or Firm* — Perkins Coie LLP

(57) ABSTRACT

A system for controlling access to cryptographic resources is disclosed. The system may receive a request to transfer cryptographic resources between users, including a user identifier and a first cryptographic signature. The system may verify the signature and retrieve an encrypted private key from a key vault using the user identifier. A command to sign the request may be transmitted over a private network to a signature device, which may generate a second cryptographic signature using the decrypted private key. The system may receive the second signature, generate a blockchain operation based on the request and signature, and transmit the operation to a blockchain node for commitment. The system may also handle new account generation, storing encrypted keys in jurisdiction-specific databases, and validating blockchain operations against request parameters.

20 Claims, 14 Drawing Sheets

200

| | |
|---|---|
| Source User Identifier | 0x19dE91Af973F404EDF5B4c093983a7c6Ebbb3ba |
| Target User Identifier | <Parameter Data> |
| Resource Quantity | <Parameter Data> |
| Resource Type | <Parameter Data> |

203 — Source User Identifier
206 — Target User Identifier
209 — Resource Quantity
212 — Resource Type

| User Identifier | Encrypted Private Key |
|---|---|
| User_1 | thwGLxbKA1JMz/ 4e6N+EtOauG0PEImrQpPwXsUpo9bOzsbW CaslJceXS6yrUulCo60V6RvZoFRh1exw3rjA qiA== |
| User_2 | thwGLxbKA1JMz/ 4e6N+EtOauG0PEImrQpPwXsUpo9bOzsbW CaslJceXS6yrUulCo36tBn2cnrKBSRO6tRlhc Pg== |
| User_3 | thwGLxbKA1JMz/ 4e6N+EtOauG0PEImrQpPwXsUpo9bOzsbW CaslJceXS6yrUulCoOAZ42+m34hAWezdiE7 NWXQ== |

| User Identifier | Encrypted Private Key | | |
|---|---|---|---|
| User_1 | thwGLxbKA1JMz/4e6N+EtOau | pPwXsUpo9bOzsbWCaslJceXS6yrUul | RvZoFRh1exw3rjAqiA== |
| User_2 | 4e6N+EtOauG0PElmrQpPwXsU | po9bOzsbWCaslJceXS6yrUulC | o36tBn2cnrKBSRO6tRlhcPg== |
| User_3 | thwGLxbKA1JMz/4e6N+EtOau | ElmrQpPwXsUpo9bOzsbWCaslJceX | ulCoOAZ42+m34hAWezdiE7NWXQ== |

FIG. 3B

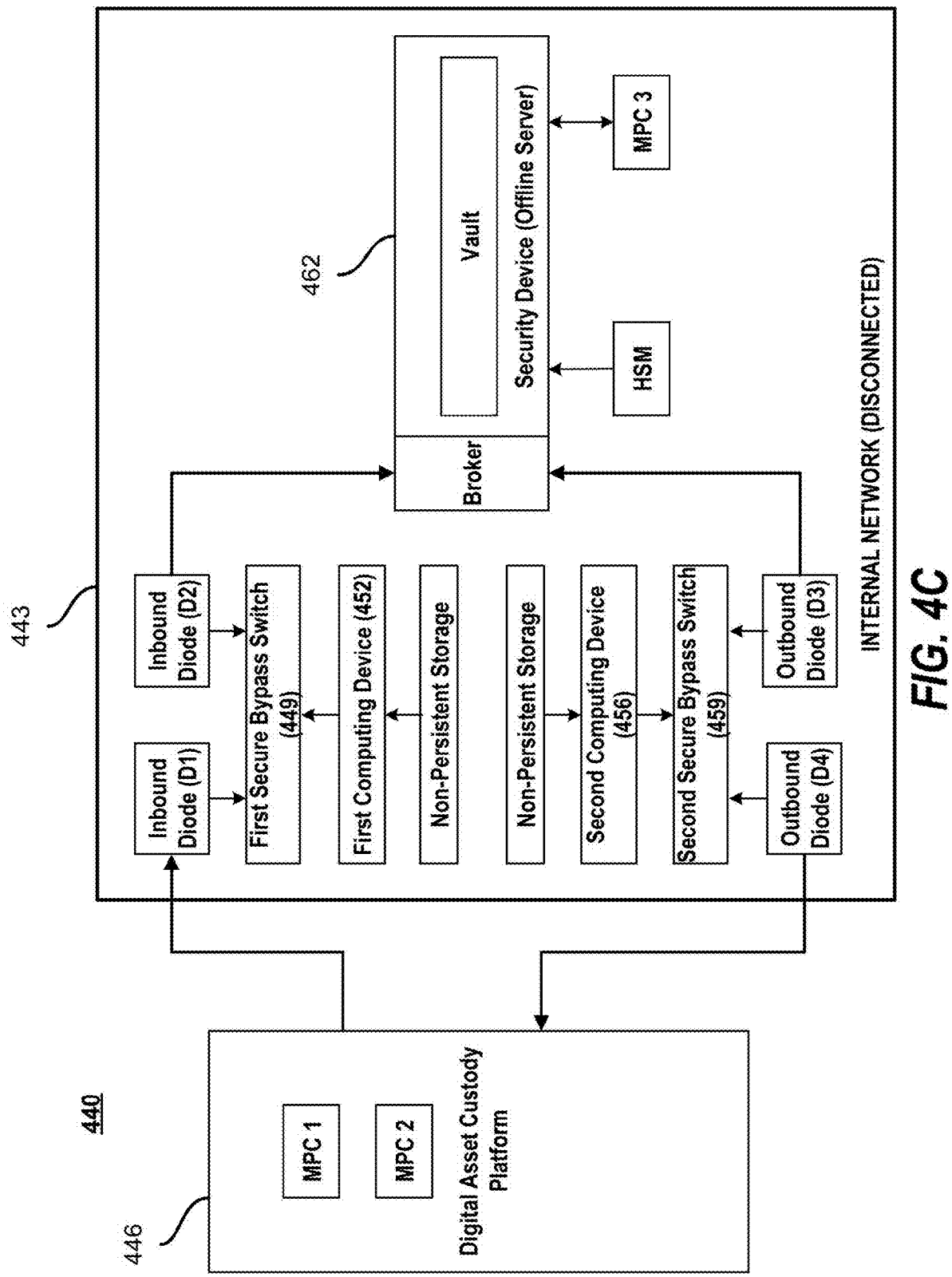

500

| Source Address | <source address> |
|---|---|
| Target Address | <target address> |
| Cryptographic Signature | <cryptographic signature> |
| Parameter_1 | <Parameter Data> |

503 — Source Address
506 — Target Address
509 — Cryptographic Signature
512 — Parameter_1

```
┌─────────────────────────────────────────────────┐
│   Receive request to transfer cryptographic resources   │
│                       902                       │
└─────────────────────────────────────────────────┘
                        ↓
┌─────────────────────────────────────────────────┐
│      Retrieve encrypted key object from key vault       │
│                       904                       │
└─────────────────────────────────────────────────┘
                        ↓
┌─────────────────────────────────────────────────┐
│   Transmit decryption command to first security device  │
│                       906                       │
└─────────────────────────────────────────────────┘
                        ↓
┌─────────────────────────────────────────────────┐
│     Receive encrypted key shards from first device      │
│                       908                       │
└─────────────────────────────────────────────────┘
                        ↓
┌─────────────────────────────────────────────────┐
│      Transmit key shards to second security device      │
│                       910                       │
└─────────────────────────────────────────────────┘
                        ↓
┌─────────────────────────────────────────────────┐
│  Generate blockchain operation with cryptographic signature  │
│                       912                       │
└─────────────────────────────────────────────────┘
                        ↓
┌─────────────────────────────────────────────────┐
│    Transmit blockchain operation to blockchain node     │
│                       914                       │
└─────────────────────────────────────────────────┘
```

FIG. 9

CONTROLLING ACCESS TO CRYPTOGRAPHIC RESOURCES USING OFFLINE STORAGE

BACKGROUND

Blockchain technologies have emerged as significant components of modern resource systems and digital asset management. These technologies offer decentralized, secure methods for transferring and storing resources. However, the management and transfer of these resources present unique challenges, particularly in areas of security. Current systems for handling cryptographic resources often struggle with balancing security and accessibility. While cold storage solutions provide enhanced security, they can be cumbersome for frequent operations. Conversely, hot vaults offer convenience but may be more vulnerable to unauthorized access by malicious actors. Additionally, as cryptographic resource adoption grows, there is an increasing need for systems that can efficiently manage large-scale operations and storage across different locations.

The complexity of blockchain operations and their irreversible nature necessitate robust verification and authorization processes. Existing solutions may not adequately address the nuanced requirements, especially when dealing with multi-location operations. There is a growing demand for systems that can provide secure, compliant, and efficient management of cryptographic resources while accommodating the diverse needs of users across various geographical locations.

SUMMARY

Accordingly, methods and systems are described herein for controlling access to cryptographic resources. A resource transfer system may be used to perform operations described herein. The resource transfer system may receive a request to transfer cryptographic resources between users, including a user identifier and a verification signature. The resource transfer system may verify the signature and retrieve an encrypted private key for the first user from a key vault. A command to sign the request may be sent over a private network to a signature device. The signature device may generate a second signature using the decrypted private key. The resource transfer system may receive this second signature and use it to generate a blockchain operation. The blockchain operation may then be transmitted to a blockchain node for commitment to the blockchain.

The resource transfer system may include components for receiving and processing transfer requests. Specifically, the resource transfer system may include one or more processors and one or more non-transitory computer-readable storage media storing instructions. When executed by the one or more processors, these instructions may cause the processors to perform operations for controlling access to cryptographic resources. For example, the processors may execute software for request handling, signature verification, key management, and blockchain interactions.

The system employs advanced key management techniques to protect sensitive cryptographic information. The system stores double encrypted wallets in a database rather than in the key management systems. For example, instead of keeping encrypted private keys directly in hardware security modules (HSMs) or multi-party computation (MPC) systems, the encrypted keys may be stored in a separate secure database. This approach allows for greater flexibility in key storage and retrieval while maintaining a high level of security. In addition, this approach enables greater segregation of access to keys (e.g., access by different individuals and/or teams) thereby increasing security.

The system utilizes a multi-layered encryption process to safeguard encryption/decryption key information. The system double encrypts/decrypts keys located on each MPC before storing in a database. For instance, a user's private key may first be encrypted using an HSM, which applies a layer of hardware-based encryption. The resulting encrypted key may then be further encrypted using an MPC system, which distributes the encryption process across multiple parties. This doubly encrypted wallet data may then be stored in a secure database, providing an additional layer of protection against unauthorized access.

The use of double encryption enhances the security of stored wallet information. By applying encryption at multiple levels, the system creates additional barriers that potential attackers would need to overcome to access the underlying private keys. For example, even if an attacker were to gain access to the database containing the encrypted wallets, they would still need to bypass both the HSM and MPC encryption layers to retrieve the original private key information. Furthermore, as described above, this approach also enables greater segregation of access to keys (e.g., access by different individuals and/or teams) thereby increasing security Retrieving and using double encrypted wallet data involves a multi-step process. When a user needs to access their wallet, the system may first retrieve the doubly encrypted data from the secure database. Each MPC may decrypt a corresponding portion of the key. This process ensures that the private key is only fully decrypted when it is needed for a specific transaction, minimizing the time during which the unencrypted key is accessible.

The separation of encrypted wallet storage from key management systems provides additional security benefits. By storing the encrypted wallets in a separate database, the system reduces the risk of a single point of failure. For example, if an attacker were to compromise one of the key management systems, they would not have direct access to the encrypted wallet data, which is stored separately. This separation adds an extra layer of protection to the overall key management architecture.

In some embodiments, the resource transfer system may receive requests to transfer control of cryptographic resources between users. Specifically, the resource transfer system may receive a request to transfer control of a first number of cryptographic resources from a first user to a second user. This request may include a user identifier associated with the first user and a first cryptographic signature of a verification engine that verified the request. The first user may control a first cryptography-based storage application and the second user may control a second cryptography-based storage application. For example, the resource transfer system may receive an API call containing transfer details, user IDs, and a signature from an authentication service for cryptographic resource transfers.

The resource transfer system may verify the authenticity of received requests. Specifically, the resource transfer system may verify the first cryptographic signature of the verification engine. For example, the resource transfer system may use the verification engine's public key to validate that the signature was generated by the authorized verification service.

The resource transfer system may securely retrieve encrypted private keys for a user. Specifically, the resource transfer system may retrieve, from a key vault using the user identifier, an encrypted private key associated with the first user. This encrypted private key, when decrypted, may be used to generate a second cryptographic signature for a blockchain operation to transfer control of the first number of cryptographic resources to be controlled by the second user. For example, the resource transfer system may query a secure database using the user's ID to obtain their encrypted private key. The encrypted private key, when decrypted may be used to sign a blockchain operation.

The resource transfer system may utilize a secure signature device to cryptographically sign requests. Specifically, the resource transfer system may transmit, over a private network to a signature device, a command to cryptographically sign the request. The signature device may generate the second cryptographic signature for the blockchain operation. The private network may be inaccessible by devices not involved in authorizing requests. The command may include the encrypted private key. For example, the resource transfer system may send an encrypted message to a hardware security module over an isolated network to request a transaction signature.

The resource transfer system may receive cryptographic signatures from the signature device. Specifically, the resource transfer system may receive, from the signature device over the private network, the second cryptographic signature generated based on the encrypted private key. The signature device may decrypt the encrypted private key using a decryption key corresponding to the encrypted private key. For example, the resource transfer system may receive a digital signature of the transaction details from the hardware security module.

The resource transfer system may then generate blockchain operations to execute transfers. Specifically, the resource transfer system may generate the blockchain operation based on the request and the second cryptographic signature. The second cryptographic signature may be used by a blockchain node of a blockchain to authorize the blockchain operation. For example, the resource transfer system may construct a blockchain operation containing the transfer details and cryptographic proof of authorization.

The resource transfer system may submit blockchain operations to the network. Specifically, the resource transfer system may transmit the blockchain operation to the blockchain node. The blockchain node may commit the blockchain operation to the blockchain. For example, the resource transfer system may broadcast the signed transaction to blockchain network nodes for validation and inclusion in the next block.

The resource transfer system may handle new account creation requests. Specifically, the resource transfer system may receive a new account generation request for a new user. For example, the resource transfer system may receive an API call to create, for a new user, a public/private key pair.

The resource transfer system may initiate secure key generation for new accounts. Specifically, the resource transfer system may transmit a key generation request to the signature device. The signature device may generate a new private key and a new public key. The signature device may then encrypt the new private key into a new encrypted private key using a new encryption key that is generated on the signature device. For example, the resource transfer system may instruct a hardware security module to create a new key pair (private and public keys) and encrypt the private key. In some embodiments, a single encryption/decryption key may be used for each key vault. Thus, a new encryption/decryption key may not need to be generated when a new account is created. Furthermore, each MPC node may have a corresponding encryption/decryption key. In yet some embodiments, hot vaults may have one set of encryption/decryption keys and cold vaults may have another set of encryption/decryption keys. In yet some embodiments, the resource transfer system may instruct a key management module (e.g., an MPC system) to generate the keys and export the encrypted private key for storage in a database. Thus, key generation and encryption is not required to be performed on the HSM system directly).

The resource transfer system may receive newly generated keys for storage. Specifically, the resource transfer system may receive the new encrypted private key and the new public key from the signature device. For example, the resource transfer system may obtain the encrypted private key and corresponding public key from the hardware security module over a secure channel. In some embodiments, the encrypted private key may be obtained from another system (e.g., an MPC system).

The resource transfer system may securely store newly generated keys. Specifically, the resource transfer system may transmit the new encrypted private key to a database server. The database server may store the new encrypted private key in the key vault. For example, the resource transfer system may send the encrypted private key to a secure database for long-term storage.

In some aspects, the resource transfer system may enable controlling access to cryptographic resources using double encryption. In particular, the resource transfer system may receive a request to transfer control of cryptographic resources between users. The system may retrieve an encrypted key object representing a private key from a key vault using a user identifier. A decryption command may be transmitted to a first security device to decrypt the encrypted key object into encrypted key shards (first encryption). The resource transfer system may then receive the encrypted key shards from the first security device, and may transmit the encrypted key shards and a signature generation command to a second security device. The resource transfer system may receive the cryptographic signature or portions of the cryptographic signature and may generate a blockchain operation based on the request and the cryptographic signature. The blockchain operation may then be transmitted to a blockchain node for authorization.

The resource transfer system may receive a request to transfer control of cryptographic resources from one user to another. Specifically, the resource transfer system may receive a request to transfer control of a first number of cryptographic resources from a first user to a second user. For example, the request may be to transfer control of 10 units of a cryptographic resource from a cryptography-based storage application (e.g., storing an associated private key) associated with User A on a blockchain to a cryptography-based storage application (e.g., storing a different private key) associated with User B on the blockchain.

The system may retrieve an encrypted private key associated with the sender from secure storage. Specifically, the resource transfer system may retrieve, from a key vault using a user identifier associated with the first user, an encrypted key object that represents a private key. The encrypted key object may include a plurality of encrypted key shards. For example, the system may look up User A's encrypted private key in a secure database using User A's unique ID. The private key may be double encrypted using two different security systems. The first security system may have generated a private key (e.g., for signing blockchain operations) in portions (e.g., key shards). Each key shard may be encrypted by each node of the first security system (e.g., encrypted by the node that generated the shard). The second security system may encrypt the encrypted key shards a second time. In some embodiments, the second encryption operations may be performed on all the shards. However, in some embodiments, the second encryption operation may be performed on each shard separately.

Thus, the system may send the encrypted key to a first security device for initial decryption. Specifically, the resource transfer system may transmit, to a first security device, a decryption command to decrypt the encrypted key object. The first security device may decrypt the encrypted key object into the plurality of encrypted key shards. For example, the system may send User A's encrypted private key to a hardware security module (HSM) that decrypts the outer layer of encryption.

The system may receive the partially decrypted key from the first security device. Specifically, the resource transfer system may receive, from the first security device, the plurality of encrypted key shards representing the private key. For example, the HSM may return the key shards that are still encrypted with a second layer of encryption.

The system may send the partially decrypted key to a second security device for final decryption and signature generation. Specifically, the resource transfer system may transmit, to a second security device, the plurality of encrypted key shards and a command to generate a cryptographic signature for signing a blockchain operation. For example, the system may send the encrypted key shards to a multi-party computation (MPC) system that can decrypt the final layer and generate a signature. The MPC may distribute the key shards to corresponding nodes that store decryption keys for those key shards. Those nodes may decrypt the key shards and generate signature portions of the cryptographic signature. The signature portions may be put together to generate the signature either by the MPC or at the resource transfer system.

The system may create a blockchain transaction using the generated signature. Specifically, the resource transfer system may generate the blockchain operation based on the request and the cryptographic signature. The cryptographic signature may be used by a blockchain node of a blockchain to authorize the blockchain operation. For example, the system may construct a transaction to transfer 10 units of cryptographic resources from User A to User B and sign the transaction with the signature from the MPC system.

The system may submit the signed transaction to the blockchain network. Specifically, the resource transfer system may transmit the blockchain operation to the blockchain node. For example, the system may broadcast the signed transaction to Bitcoin or Ethereum network nodes for processing and inclusion in the blockchain. It should be noted that the original public and private keys for encrypting the blockchain operation may have been generated during account creation and those public and private keys as well as corresponding wallet addresses may be compatible with a corresponding blockchain for which they were made.

As discussed above, the resource transfer system may use the decrypted key shards to generate partial signatures that are combined into the full signature. Specifically, each key shard of the plurality of encrypted key shards, when decrypted, may be used to generate a corresponding portion of the cryptographic signature for the blockchain operation to transfer control of the first number of cryptographic resources to be controlled by the second user. For example, each MPC node may generate a partial signature using its key shard, which are then combined into the complete transaction signature. Furthermore, each MPC node may generate a decryption key for each corresponding shard when a new user account is created. In some embodiments, there may be a single decryption key per vault. Thus, a new decryption key may not be generated with every new user. The decryption key may be selected based on the vault into which the user's key data will be placed.

In some embodiments, the resource transfer system may cause the encrypted key shards to be distributed to multiple nodes for decryption and partial signature generation. Specifically, the second security device may transmit each encrypted key shard of the plurality of encrypted key shards to a corresponding node that encrypted each shard. Furthermore, each corresponding node may generate a corresponding portion of the cryptographic signature corresponding to an encrypted shard of the plurality of encrypted key shards. For example, the MPC system may send each encrypted key shard to a separate node for decryption and partial signature generation. Thus, each node may generate a partial signature and then the MPC may combine the partial signature into a complete signature. In some embodiments, the resource transfer system may combine the different key shards into a complete signature.

The resource transfer system may generate new cryptographic accounts for users using a special mechanism. Specifically, the resource transfer system may first receive a new account generation request for a new user. For example, the system may receive a request to create a new Bitcoin cryptographic wallet for a new customer.

The resource transfer system may request generation of new cryptographic keys. Specifically, the resource transfer system may transmit a key generation request to the second security device, which may generate a new private key and a new public key for the new user. Furthermore, the second security device may use security nodes (e.g., coupled to the second security device) to generate new plurality of key shards and may send each new key shard to a corresponding node. For example, each node may generate and encrypt a corresponding new key shard. For example, the system may instruct the MPC system to generate a new key pair, such that the new private key is generated as a plurality of shards, and encrypt the shards on their corresponding nodes of the MPC. In some embodiments, the key may be generated externally from the MPC and split.

The resource transfer system may receive the newly generated encrypted key material. Specifically, the resource transfer system may receive the new encrypted plurality of key shards and the new public key from the second security device. For example, the system may receive the encrypted key shards and public key from the MPC system.

The resource transfer system may apply additional encryption to the key material. Specifically, the resource transfer system may transmit the new encrypted plurality of key shards to the first security device with an encryption command to encrypt the new encrypted plurality of key shards into a new encrypted private key, such that the first security device may encrypt the new plurality of key shards into the new encrypted private key using a second encryption key that is generated on the first security device. For example, the system may send the encrypted key shards to the HSM for an additional layer of encryption.

The resource transfer system may store the newly generated and encrypted key material in a key vault. Specifically, the resource transfer system may transmit the new encrypted private key to a database server that stores the new encrypted private key in the key vault. For example, the system may store the double-encrypted private key in a secure database indexed by the user's ID.

The resource transfer system may store user keys in jurisdiction-specific databases. Specifically, when transmitting the new encrypted private key to the database server, the resource transfer system may retrieve user data associated with the new user. The resource transfer system may determine based on the user data associated with user a user's location, wherein the user's location may comprise a jurisdiction of the user. The resource transfer system may identify, based on the user's location, the database server within the jurisdiction of the user. The database server may be one of a plurality of database servers active in a plurality of different jurisdictions. The resource transfer system may transmit the new encrypted private key to the database server identified based on the jurisdiction corresponding to the user. For example, if the user is located in Brazil, the system may store their encrypted key in a database server physically located in Brazil to comply with data localization laws.

The resource transfer system may look up a user's encrypted key using their identifier. Specifically, when retrieving, from the key vault using the user identifier, the encrypted key object associated with the first user, the resource transfer system may retrieve, from the request, the user identifier associated with the first user. The resource transfer system may transmit, to the key vault, the user identifier associated with the first user. The resource transfer system may receive, from the key vault, the encrypted key object associated with the first user. For example, when processing a transaction request, the system may extract the user's ID, query the key vault with that ID, and receive the user's encrypted private key in response.

In some embodiments, the resource transfer system may combine partial signatures into a complete signature. Specifically, the resource transfer system may receive, from the second security device, a plurality of portions of the cryptographic signature generated based on the plurality of encrypted key shards. The cryptographic signature may be used to cryptographically sign the blockchain operation. The resource transfer system may combine the plurality of portions of the cryptographic signature into the cryptographic signature. For example, the system may receive partial signatures from each MPC node and mathematically combine them into a single valid signature for the blockchain transaction.

In some aspects, the resource transfer system may control access to cryptographic resources using offline storage. In some embodiments, the resource transfer system may receive a transfer request while connected to an external network to transfer control of cryptographic resources between users. The computing device hosting the resource transfer system may be coupled to (e.g., connected to) a security device storing decryption keys. In addition, the resource transfer system may be coupled to a secure bypass switch that physically switches network connections. The resource transfer system may transmit commands to switch between external and internal networks that are physically air gapped. The resource transfer system may transmit a signature request to the security device on the internal network to generate a cryptographic signature after the secure bypass switches is switched to the internal network from the external network. While connected to the internal network, the resource transfer system may receive the cryptographic signature from the security device. The system may switch back to the external network and transmit the signature to a requesting device.

In some embodiments, the resource transfer system may receive a transfer request while connected to an external network. Specifically, the resource transfer system may receive, at a computing device while connected to an external network, a transfer request to transfer control of a number of cryptographic resources from a first user to a second user. The transfer request may include a user identifier and a transaction hash of a blockchain operation. For example, the transfer request may be received from a user's mobile device and contain the user's account ID and a hash of a proposed blockchain operation.

The resource transfer system may be connected to specialized security hardware. The computing device may be coupled to both a security device that stores decryption keys and a secure bypass switch. The secure bypass switch may physically switch a network connection of the computing device between the external network and an internal network. For instance, the computing device may be connected to a hardware security module storing encryption keys and a physical network switch that can toggle between an internet-connected network and an isolated internal network.

The resource transfer system may utilize physical network separation for security. The external network and the internal network may be physically prevented from being simultaneously connected to the computing device using an air gap. As an example, there may be no physical wired or wireless connection between the external and internal networks, with data transfer occurring only through the secure bypass switch.

Furthermore, the resource transfer system may switch to an internal network upon receiving a transfer request. In response to receiving the transfer request, the resource transfer system may transmit a first command to the secure bypass switch to switch the network connection from the external network to the internal network. For example, upon validating the transfer request, the system may send an electronic signal to the bypass switch to disconnect from the internet and connect to the internal network. In some embodiments, the secure bypass switch may switch networks (e.g., from internal to external and vice versa) based on automated timer. For example, the secure bypass switch may be connected to a first network (internal) for five minutes (or another suitable time period) and to a second network (external) for five minutes (or another suitable time period). In some embodiments, the secure bypass switch may be manually controlled by a user (e.g., a physical switch to be toggled). In the case of manual bypass switch, the user attempting to access the vault for signature or for account manipulation may need to physically switch the secure bypass switch from one network to another.

The resource transfer system may request cryptographic signing on the internal network. Subsequently to transmitting the first command, the resource transfer system may transmit, to the security device on the internal network, a signature request requesting generation of a cryptographic signature for the blockchain operation using the transaction hash and the user identifier. The security device may decrypt a private key associated with the user identifier and generate the cryptographic signature using the transaction hash. As an illustration, once on the internal network, the system may send the user ID and transaction details to a hardware security module use the user's private key (stored at the hardware security module) and create a digital signature for the transaction using that private key.

The resource transfer system may receive the generated signature. The resource transfer system may receive, from the security device, the cryptographic signature. For instance, the hardware security module may return the completed digital signature to the main system over the internal network connection.

The resource transfer system may switch back to the external network after receiving the signature. In response to receiving the cryptographic signature, the resource transfer system may transmit a second command to the secure bypass switch to switch the network connection from the internal network to the external network. As an example, once the signature is received, the system may signal the bypass switch to disconnect from the internal network and reconnect to the internet. In some embodiments, the computing device may be connected to an external network other than the internet (e.g., a different network internal to the host of the resource transfer system.

The resource transfer system may provide the signature to complete the transfer. The resource transfer system may transmit the cryptographic signature to a requesting device. For instance, the system may send the digital signature back to the user's mobile device or to a blockchain network to complete and broadcast the blockchain operation.

According to other aspects of the present disclosure, the resource transfer system may include one or more of the following features. The resource transfer system may receive, while connected to the external network, a new account generation request to generate a new account for a new user. The resource transfer system may transmit, to the secure bypass switch, a switching command to connect the computing device to the internal network. In response to connecting to the internal network, the resource transfer system may transmit an account generation command to the security device. The new account generation request may include one or more commands to generate a new private key and a new public key for the new user. The resource transfer system may transmit an indication that the new account has been created. The indication may include the new public key.

In some embodiments, the resource transfer system may generate a shard generation command to generate a plurality of cryptographic key shards using the security device. Each cryptographic key shard of the plurality of cryptographic key shards may enable generation of a partial cryptographic signature that signs one or more blockchain operations. The resource transfer system may generate an encryption command that instructs the security device to encrypt each cryptographic key shard of the plurality of cryptographic key shards. The resource transfer system may then transmit the shard generation command and the encryption command to the security device. The security device may generate the new private key the new private key including the plurality of cryptographic key shards and encrypt each cryptographic key shard.

In some embodiments, the new account generation request may include an identifier of a blockchain network indicating a type of keys required. The account generation command may include a request to return the new public key, and the new public key may be used to generate a cryptographic address on a corresponding blockchain. The security device may be connected to the internal network only and may be isolated from other networks.

The transfer request may include an encrypted private key for generating the cryptographic signature, and the security device may store one or more decryption keys for decrypting the encrypted private key. The resource transfer system may extract, at the computing device, the encrypted private key. The resource transfer system may transmit, to the security device an instruction to sign the blockchain operation using a decrypted instance of the encrypted private key. The security device may decrypt the encrypted private key and sign the blockchain operation.

In some embodiments, the resource transfer system may have an additional layer of security by including multiple computing devices-one for receiving requests from the external network and one for sending responses to the external network. Both devices may be connected to independent secure bypass switches.

As discussed above, the resource transfer system may utilize specialized network switching hardware to isolate sensitive operations. The system may include a first secure bypass switch connecting a receiver computing device to an external network or to an internal network and a second secure bypass switch connecting a sender computing device to the external network or to the internal network. Each of the first secure bypass switch and the second secure bypass switch may physically switch a corresponding network connection of a corresponding computing device between the external network and the internal network. The external network and the internal network may be physically prevented from being simultaneously connected to each computing device using an air gap. For instance, the system may employ two physical network switches that can toggle connections between an internet-facing network and an isolated internal network, with no simultaneous connection possible.

The resource transfer system may include a receiver device for processing transfer requests. The receiver computing device may be coupled to the security device and the first secure bypass switch. The receiver computing device may include one or more processors and one or more non-transitory computer-readable storage media storing instructions. When executed by the one or more processors, these instructions may cause the one or more processors to perform certain operations. As an example, the receiver device may be a server connected to both the HSM and network switch, with software for handling incoming requests.

The resource transfer system may receive transfer requests over an external network. The receiver computing device may receive, while connected to the external network, a transfer request to transfer control of a number of cryptographic resources from a first user to a second user. The transfer request may include a user identifier and a hash of a blockchain operation. For example, the system may receive a request via the internet to transfer cryptocurrency, including the sender's account ID and a hash of the proposed transaction.

The resource transfer system may initiate a network switch upon receiving a transfer request. In response to receiving the transfer request, the receiver computing device may transmit a first command to the first secure bypass switch to switch from the external network to the internal network. As an illustration, upon validating the incoming request, the receiver may signal the network switch to disconnect from the internet and connect to the isolated internal network.

The resource transfer system may request cryptographic signing on the internal network. Subsequently to transmitting the first command, the receiver computing device may transmit, to the security device on the internal network, a signature request requesting generation of a cryptographic signature for the blockchain operation using the hash and the user identifier. For instance, once on the internal network, the receiver may send the user ID and transaction details to the HSM to use the user's private key to create a digital signature.

The resource transfer system may process the signature request using the security device. The first command may instruct the security device to (1) decrypt a private key associated with the user identifier and generate the cryptographic signature using the hash and (2) transmit the cryptographic signature to the sender computing device. As an example, the HSM may decrypt the user's private key, sign the transaction hash, and send the resulting signature to a separate sender device.

The resource transfer system may transmit the signature over the external network. The sender computing device may instruct the second secure bypass switch to switch the corresponding network connection from the internal network to the external network and transmit the cryptographic signature to the external network. For instance, the sender device may signal its network switch to reconnect to the internet and then broadcast the signed transaction to the blockchain network.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), of a given item (e.g., data), unless the context clearly dictates otherwise.

BRIEF DESCRIPTION OF FIGURES

Non-limiting and non-exhaustive examples are described with reference to the following figures.

FIG. 2 illustrates a block diagram of a request data structure, in accordance with example embodiments.

FIG. 3A illustrates a block diagram of a key vault system, in accordance with example embodiments.

FIG. 3B illustrates a block diagram of a key storage system, in accordance with example embodiments.

FIG. 4C illustrates block diagram of another cold storage environment, in accordance with example embodiments.

FIG. 5 illustrates a block diagram of a blockchain operation, in accordance with example embodiments.

FIG. 9 illustrates a flowchart for controlling access to cryptographic resources using double encryption, in accordance with example embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
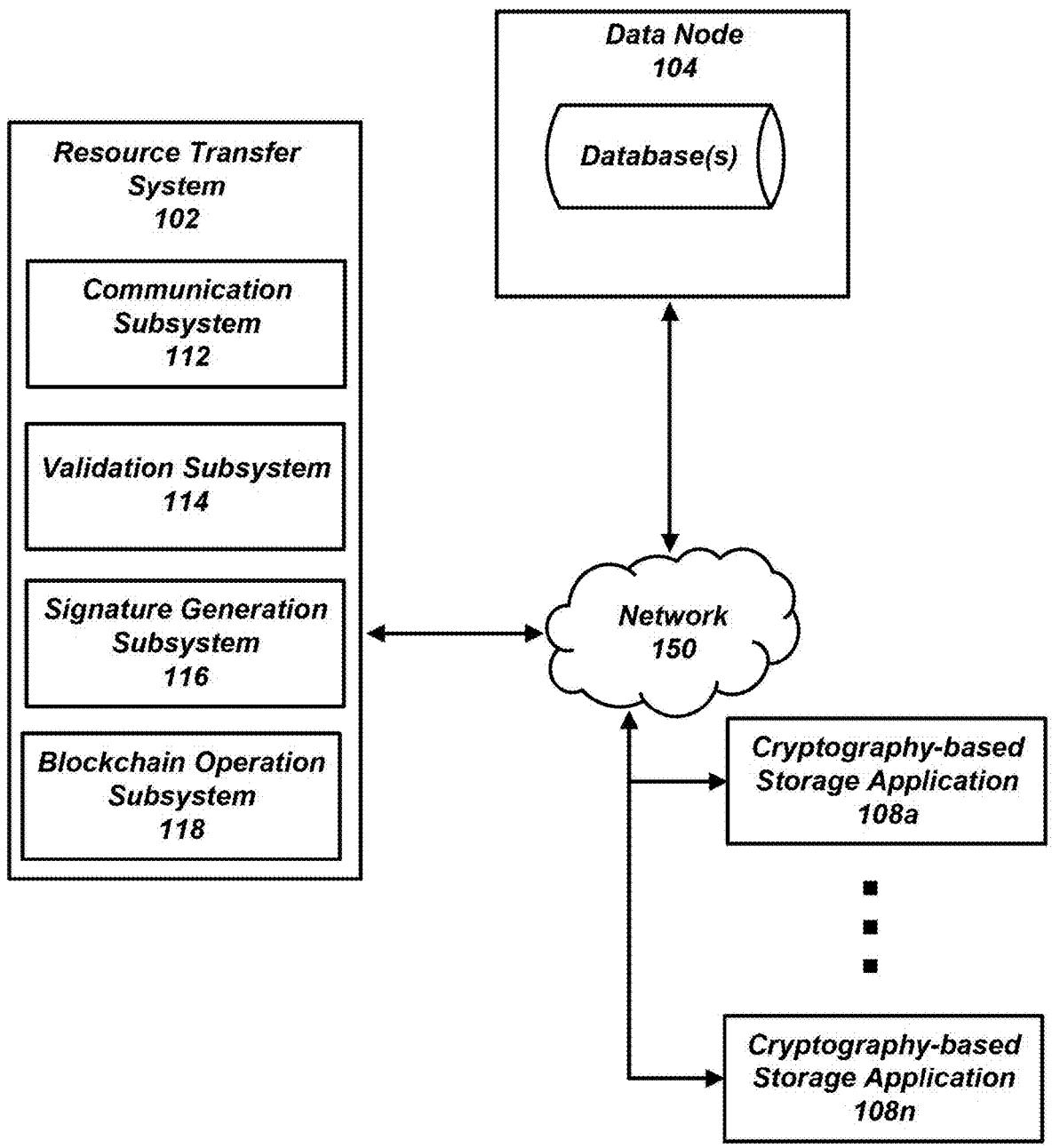
FIG. 1 illustrates a system environment for managing cryptographic resource transfers, in accordance with example embodiments.

FIG. 1 is an example of environment 100 for managing cryptographic resource transfers. Environment 100 includes resource transfer system 102, data node 104, and cryptography-based storage applications 108a-108n connected via network 150. Resource transfer system 102 may execute instructions for controlling access to cryptographic resources. Resource transfer system 102 may include software, hardware, or a combination of the two. For example, resource transfer system 102 may be hosted on a physical server or a virtual server that is running on a physical computer system. In some embodiments, resource transfer system 102 may be configured on a user device (e.g., a laptop computer, a smartphone, a desktop computer, an electronic tablet, or another suitable user device). In some embodiments, resource transfer system 102 may be hosted on a blockchain node. In some embodiments, resource transfer system 102 may be hosted on an independent computing device and may send requests to the blockchain node to execute instructions (e.g., transfer cryptographic resources, verify signatures, etc.).

Each of the cryptography-based storage applications 108a-108n may sometimes be referred to as a cryptographic wallet. Each cryptography-based storage application may store a private key associated with a corresponding user and may include software, hardware, or a combination of the two. For example, each cryptography-based storage application may include software executed on one or multiple devices or may include hardware such as a physical device. In some cases, a cryptography-based storage application may be software and may be stored in data nodes and a user of the cryptography-based storage application may access the cryptography-based storage application online, e.g., via a browser. Alternatively or additionally, a cryptography-based storage application may reside on a general-purpose computer or on a special device (e.g., a fob) intended for storing the cryptography-based storage application. For example, the device may store private keys in a memory of the device and allow transactions to be completed on the device itself. Some examples of hardware cryptographic wallets include Ledger®, and Trezor®. Software cryptographic wallets may include MetaMask® and others.

Data node 104 may store various data, including user identifiers, encrypted private keys, and/or other suitable data related to cryptographic resource transfers. Data node 104 may include software, hardware, or a combination of the two. For example, data node 104 may be a physical server or a virtual server that is running on a physical computer system. In some embodiments, resource transfer system 102 and data node 104 may reside on the same hardware and/or the same virtual server/computing device. Network 150 provides connectivity between resource transfer system 102, data node 104, and cryptography-based storage applications 108a-108n, facilitating the transmission of data and commands between these components. Network 150 may be a local area network, a wide area network (e.g., the Internet) or a combination of both.

As shown in FIG. 1, resource transfer system 102 includes several subsystems that work together to process and validate resource transfers. Communication subsystem 112 may handle data exchange between the resource transfer system 102 and other components in environment 100. Validation subsystem 114 may perform verification of transfer requests and associated signatures. Signature generation subsystem 116 may manage the process of generating cryptographic signatures for authorized transfers. Blockchain operation subsystem 118 may create and manage blockchain operations. For example, communication subsystem 112 may include a network card (e.g., a wireless network card and/or a wired network card) that is associated with software to drive the card. Thus, resource transfer system 102 may be configured to trigger various processing functions based on requests to transfer control of cryptographic resources between users.

The system may receive a request to transfer control of cryptographic resources between users. In particular, resource transfer system 102 may receive (e.g., via communication subsystem 112) a request to transfer control of a first number of cryptographic resources from a first user to a second user. The request may include a user identifier associated with the first user and a first cryptographic signature of a verification engine that verified the request. The first user may control a first cryptography-based storage application, and the second user may control a second cryptography-based storage application. For example, resource transfer system 102 may receive a request from a user interface to transfer 10 units of cryptographic tokens from User A to User B. The request may include User A's identifier and a signature from a verification service that has authenticated the request.

In some embodiments, the system may check if the request has been properly verified. In particular, resource transfer system 102 may verify (e.g., via validation subsystem 114) the first cryptographic signature of the verification engine. For instance, validation subsystem 114 may use cryptographic techniques to confirm that the signature matches the expected signature from the verification engine, ensuring the request's authenticity. In some embodiments, the verification engine may enable verification of the request itself. The verification engine may receive the request first and determine which users or administrators need to approve the request. Once the approvers are determined, the verification engine may transmit approval messages to the identified approvers. The identified approvers may approve the request by signing the approval using a corresponding private key that the verification engine is able to verify using a corresponding public key.

FIG. 2 illustrates a block diagram of a request 200, in accordance with example embodiments. Request 200 may include various fields containing information related to a cryptographic resource transfer request. Request 200 may include a source user identifier 203, which may contain an identifier value associated with the user initiating the transfer. In this example, the source user identifier 203 is shown as "0x19dE91Af973F404EDF5B4c093983a7c6EBbb3ba", which may represent a blockchain address or another unique identifier for the user sending the resources.

A target user identifier 206 may be included in the request 200, specifying the intended recipient of the cryptographic resources. This field may contain parameter data identifying the target user, such as a blockchain address or user account identifier. In some embodiments, the target user may be a cryptographic address on the blockchain controlled by the second user. Request 200 may also include a resource quantity 209 field, which may store parameter data indicating the amount or number of cryptographic resources to be transferred. This field may specify the number of tokens, coins, or other units of the resource being transferred. Additionally, the request 200 may include a resource type 212 field. This field may contain parameter data specifying the type of cryptographic resource involved in the transfer, such as the name or identifier of a particular cryptocurrency or token (e.g., bitcoin, Ethereum, etc.). This structure may allow for efficient organization and processing of transfer request information within the resource transfer system.

When the request is received, the system may retrieve a securely stored private key for the user initiating the transfer. In particular, resource transfer system 102 may (e.g., via signature generation subsystem 116) retrieve, from a key vault using the user identifier, an encrypted private key associated with the first user. The encrypted private key, when decrypted, may be used to generate a second cryptographic signature for a blockchain operation to transfer control of the first number of cryptographic resources to be controlled by the second user. Generally, a private key for a cryptography-based storage application (e.g., a cryptographic wallet) is stored on a user's device and is never transferred so as to minimize the risk of the private key being intercepted in transit or at destination. However, because the private key is encrypted, it may be stored in a key vault outside the user device and may be transported for decryption.

Thus, as shown in FIG. 3A, key vault 300 may store encrypted private keys associated with user identifiers. In some embodiments, resource transfer system 102 may query key vault 300 with the first user's identifier to retrieve the corresponding encrypted private key. FIG. 3A illustrates a block diagram of key vault 300, which may be used to securely store encrypted private keys associated with user identifiers. The key vault 300 is depicted as a table with two columns: a user identifier 303 and an encrypted key 306. However, key vault 300 may be any data structure such as a file and may be located remotely from resource transfer system 102.

User identifiers 303 may contain unique identifiers for each user of the system. These identifiers may be alphanumeric strings, blockchain addresses, or other forms of unique identification that allow the system to distinguish between different users. Encrypted keys 306 may store one or more encrypted private keys corresponding to each user. Each encrypted private key may be a complex string of characters representing the user's private key in an encrypted form. The encryption helps protect the private keys from unauthorized access or use. Each encrypted private key may be used to sign blockchain transactions to transfer control of cryptographic tokens to other blockchain addresses. That is, the user may have a blockchain address corresponding to a public key that is used to verify the transactions by a blockchain node. The private key may be stored in key vault 300 in an encrypted form.

Thus, this structure may allow for efficient retrieval of encrypted private keys when provided with a user identifier. Key vault 300 may be designed to securely manage and store these keys. When the resource transfer system needs to access a user's private key for a transaction, the resource transfer system may query key vault 300 using the appropriate user identifier, retrieving the associated encrypted private key for further processing and use in generating cryptographic signatures for blockchain operations.

In some embodiments, resource transfer system 102 may extract user identifiers from incoming requests to facilitate key retrieval. Upon receiving a request to transfer control of cryptographic resources, the resource transfer system may retrieve the user identifier associated with the first user from the request. For example, the resource transfer system may parse the request data structure to locate and extract a specific field containing the user's unique identifier, such as a blockchain address or account number.

To retrieve the encrypted private key, the resource transfer system may interact with the key vault using the extracted user identifier. The system may transmit the user identifier associated with the first user to the key vault. This transmission may occur over a secure, encrypted channel to protect the sensitive information during transit. The key vault may use the received identifier as a lookup key to search for the corresponding encrypted private key in its storage.

The process of retrieving the encrypted private key may involve the key vault performing a database query or accessing a secure storage system. Upon locating the matching entry, the key vault may return the encrypted private key associated with the first user to the requesting system. The system may receive the encrypted private key from the key vault, typically over the same secure channel used for the initial request.

In cases where the key retrieval process encounters issues, the system may implement error handling or fallback mechanisms. For instance, if no matching key is found for the provided user identifier, the system may generate an error message and prompt for user verification. Alternatively, the system may attempt to retrieve the key from a secondary backup storage location or initiate a process to regenerate the key if necessary.

The system may then send a secure request to create a digital signature for the transfer. In particular, resource transfer system 102 may transmit (e.g., using communication subsystem 112) a command to cryptographically sign the request. The signature device may generate the second cryptographic signature for the blockchain operation. In some embodiments the transmission may occur over a private network such that the encrypted private key never reaches a public network. In some embodiments, the private network may be inaccessible by devices not involved in authorizing requests. For example, resource transfer system 102 may be located in the same room/building/location as the signature device and may be directly connected (e.g., through a switch or switching infrastructure) without the data leaving the location. For example, the signature device may be a hardware security module ("HSM") that may be programmed to decrypt encrypted private keys and sign blockchain transactions/operations The command may include the encrypted private key. For instance, signature generation subsystem 116 may send an encrypted message containing the transfer details and encrypted private key to a dedicated signing server over a firewalled network connection.

In some embodiments, resource transfer system 102 may send a hash generated based on the request or based on the blockchain transaction to be used as verification of the blockchain operation. For example, resource transfer system 102 may send the hash of the blockchain transaction or some details about the request so that the data is encrypted using the private key associated with the user's cryptography-based storage application. The signature device may use encrypt the hash using the private key after the private key is decrypted from the encrypted private key.

The system may receive back a digital signature for the transfer to be used by a blockchain node to authorize the blockchain transaction/operation. Resource transfer system 102 may receive, from the signature device over the private network, the second cryptographic signature generated based on the encrypted private key. The signature device may have decrypted the encrypted private key using a decryption key corresponding to the encrypted private key. As an example, the dedicated signing server may use a hardware security module to decrypt the private key, create a signature for the transfer, and send the signature back to resource transfer system 102 over the secure network.

The decryption key may be generated during the account creation process for the particular user account and may be stored in association with an identifier of the encrypted private key and/or an identifier of the user. The system may create new accounts for users who want to start using cryptographic resources. Resource transfer system 102 may receive a new account generation request for a new user. For example, when a new user signs up for blockchain services (e.g., custody), the resource transfer system may receive a request to generate a new cryptographic account for that user.

Resource transfer system 102 may then transmit a key generation request to the signature device. Based on the request, the signature device may generate a new private key and a new public key. The signature device may generate a new encryption/decryption key and then encrypt the new private key into a new encrypted private key using the new encryption/decryption key. In some embodiments, the encryption/decryption key may be a single key. However, in some embodiments, the encryption/decryption key may be a pair of keys (e.g., a public key and private key). For instance, the resource transfer system may send a secure message to a hardware security module requesting generation of a new public/private key pair for the user's account. The hardware security module may create the key pair, encrypt the private key using a newly generated encryption key, and prepare the encrypted private key and public key for transmission back to the resource transfer system. The hardware security module may be configured to generate public/private key pairs to be used in blockchain operations/transactions by blockchain nodes. in some embodiments, the hardware security module may be configured to generate public/private keys for particular blockchain together with cryptographic wallet addresses to be used on different blockchains such as Bitcoin, Ethereum, etc.

The system may then receive the newly generated keys from the signature device. In particular, resource transfer system 102 may receive the new encrypted private key and the new public key from the signature device. As an example, the hardware security module may securely transmit the encrypted private key and the corresponding public key back to the resource transfer system over a private network connection.

The system may securely store the encrypted private key. Resource transfer system 102 may transmit the new encrypted private key to a database server. The database server may store the new encrypted private key in the key vault together with other private keys. For example, the resource transfer system may send the encrypted private key to a secure database server that manages the key vault. The database server may then store the encrypted private key in the key vault, associating it with the new user's account identifier for future retrieval when needed for transactions (e.g., key vault as shown in FIG. 3A).

In some embodiments, the system may store the users' private keys in different locations based on users' presence within a jurisdiction and/or being a citizen of a certain jurisdiction. In particular, when transmitting the new encrypted private key to the database server, resource transfer system 102 may transmit the new encrypted private key to a different database server based on user's location, jurisdiction, and/or citizenship. Resource transfer system may retrieve user data associated with the new user and determine based on the user data associated with user a user's location. The user's location may be a jurisdiction where the user resides, jurisdiction where the user holds citizenship or another suitable jurisdiction. In one example, resource transfer system 102 may use a user's legal document (e.g., passport, driver's license, or another suitable document to determine the location for placing the encrypted private key. The legal document may be presented when the user creates a new account or a new blockchain custody account. In some embodiments (e.g., when a legal document is in accessible), resource transfer system 102 may access user profile information, IP address data, or other relevant user data to determine the user's physical location and corresponding legal jurisdiction.

The system may then identify a database server within the user's jurisdiction to store the encrypted private key. In particular, resource transfer system 102 may identify, based on the user's location, the database server within the jurisdiction of the user. The database server is one of a plurality of database servers active in a plurality of different jurisdictions. For instance, resource transfer system 102 may maintain a mapping of jurisdictions to corresponding database servers and use this mapping to select the appropriate server based on the determined user location.

The system may securely send the encrypted private key to the identified database server in the user's jurisdiction. Specifically, resource transfer system 102 may transmit the new encrypted private key to the database server identified based on the jurisdiction corresponding to the user. As an example, resource transfer system 102 may establish a secure connection to the selected database server and transmit the encrypted private key over this connection for storage in the key vault associated with that jurisdiction.

Figure 4A:
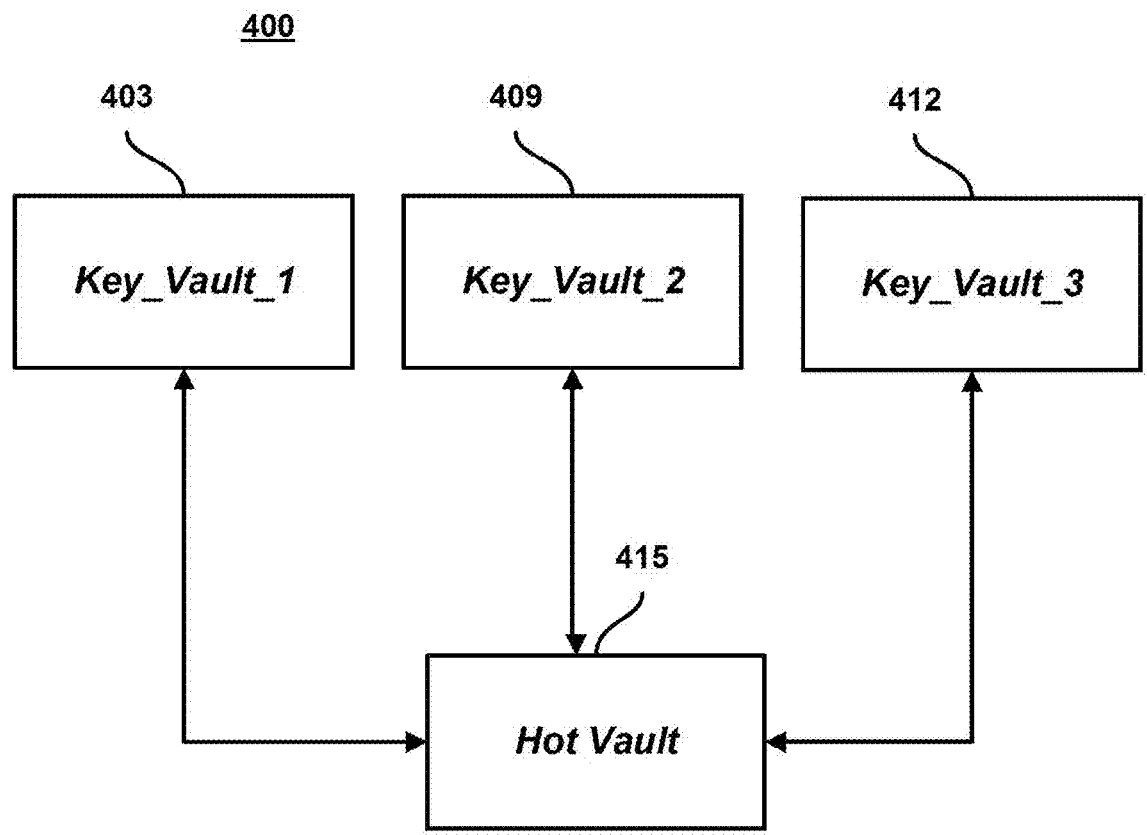
FIG. 4A illustrates a block diagram of a multi-vault system, in accordance with example embodiments.

FIG. 4A illustrates a block diagram of a vault system 400. The vault system 400 may include multiple key vaults for storing encrypted private keys across different jurisdictions or security levels. As shown, the vault system 400 may include a first key vault 403, a second key vault 409, and a third key vault 412. These key vaults may be located in different geographical regions/jurisdictions and/or may represent different levels of security within the system. In some embodiments, different levels of security may be desired based on different jurisdictions (e.g., because of different laws in those jurisdictions).

The vault system 400 also includes a hot vault 415, which may be a location (e.g., physical or logical) where one or more operations described above may be performed. Hot vault 415 may be connected to the first key vault 403, second key vault 409, and third key vault 412 through secure communication channels. Hot vault 415 may request the encrypted private keys from the other vaults in different jurisdictions. In some implementations, the first key vault 403, second key vault 409, and third key vault 412 may serve as cold storage options, providing enhanced security for long-term storage of encrypted private keys. The hot vault 415 may contain no encrypted private keys and those encrypted private keys may be erased from memory as soon as the blockchain operations is completed/sent to a blockchain node.

The architecture of vault system 400 may allow for flexible key management across different jurisdictions or security requirements. For example, encrypted private keys for users in different countries may be stored in separate key vaults to comply with local regulations. Alternatively, the different key vaults may represent varying levels of security, with the most sensitive keys stored in the most secure vault. The connections between the key vaults and the hot vault 415 may enable secure transfer of encrypted private keys when needed for transactions. This structure may provide a balance between security and accessibility, allowing the system to maintain strong protection for the majority of keys while still enabling efficient access for active operations.

The system may create a blockchain transaction using the signature and parts of the request. In particular, resource transfer system 102 may generate the blockchain operation based on the request and the second cryptographic signature. The second cryptographic signature may be used by a blockchain node of a blockchain to authorize the blockchain operation. For example, blockchain operation subsystem 118 may construct a blockchain transaction containing the transfer details and attach the received cryptographic signature, formatting it according to the blockchain's requirements. That is, blockchain operation subsystem 118 may determine a destination blockchain for the transaction and format/generate the transaction accordingly. For example, if the blockchain operation/transaction is for the Ethereum blockchain, blockchain operation subsystem 118 may format the transaction to be executed by a blockchain node on the Ethereum blockchain. However, if the blockchain operation/transaction is for the Bitcoin blockchain, blockchain operation subsystem 118 may format the transaction for execution by a blockchain node on the Bitcoin network.

FIG. 5 illustrates a block diagram of blockchain operation 500. The blockchain operation 500 may include multiple fields containing information related to a cryptographic resource transfer. The blockchain operation 500 may include a source address field 503 that may contain a source address indicating the origin of the transaction. A target address field 506 may contain a target address specifying the destination of the transfer. The blockchain operation 500 may also include a cryptographic signature field 509 that may contain a cryptographic signature associated with the transaction. Additionally, a parameter field 512 may be included to store parameter data related to the transaction. These fields may be arranged in a tabular format or other suitable formats. The structure of blockchain operation 500 may allow for efficient organization and processing of transaction information within the blockchain network.

The system may submit the transfer record to be added to the blockchain. Resource transfer system 102 may transmit the blockchain operation to the blockchain node. The blockchain node may commit the blockchain operation to the blockchain. For instance, communication subsystem 112 may send the constructed blockchain transaction to a node on the blockchain network, which then validates the transaction and includes it in the next block to be added to the blockchain.

In some embodiments, the system may validate blockchain operations by comparing parameters. Resource transfer system 102 may retrieve from the blockchain operation a first set of operation parameters associated with the blockchain operation. The first set of operation parameters may include a resource value, a first identifier corresponding to the first cryptography-based storage application, and a second identifier of the second cryptography-based storage application associated with the second user. For example, resource transfer system 102 may extract key details from the blockchain operation such as the amount of cryptocurrency being transferred, the sender's wallet address, and the recipient's wallet address.

Resource transfer system 102 may compare the extracted parameters with the original request details. Resource transfer system 102 may compare the first set of operation parameters with a second set of parameters associated with the request. For instance, resource transfer system 102 may check if the cryptocurrency amount, sender address, and recipient address in the blockchain operation match those specified in the initial transfer request.

Based on the comparison results, resource transfer system 102 may determine if the operation is valid. Based on determining that the first set of operation parameters matching the second set of parameters, resource transfer system 102 may validate the blockchain operation. For example, if all key parameters align between the blockchain operation and the original request, resource transfer system 102 may mark the operation as valid and allow it to proceed. If any discrepancies are found, resource transfer system 102 may flag the operation for further review or rejection.

The system may handle transfers involving multiple jurisdictions. Resource transfer system 102 may determine that the request includes a command to transfer control of the first number of cryptographic resources from a first jurisdiction and from a second jurisdiction. For example, the system may analyze the request details and identify that the transfer involves moving assets from wallets associated with different legal jurisdictions. For example, a user may not have enough cryptographic resources being controlled by a single cryptography-based storage application (e.g., cryptographic wallet). Accordingly, resource transfer system 102 may identify one or more other cryptography-based storage application addresses associated with the user so that control of cryptographic resources is transferred to the recipient user (e.g., target user). In some embodiments, those cryptography-based storage application addresses and corresponding encrypted private keys may be stored in different jurisdictions. In some embodiments, resource transfer system 102 may select a cryptographic wallet based on the location of the encrypted private key. Resource transfer system 102 may make a selection based on the best jurisdiction for performing the blockchain operation.

Resource transfer system 102 may determine that the first cryptography-based storage application is associated with the first jurisdiction. The system may check the metadata or registration information of the first cryptography-based storage application to confirm its jurisdictional association. For instance, the system may verify that the first application is registered under the laws of the first jurisdiction. In some embodiments, resource transfer system 102 may perform a lookup of the associated encrypted private key to determine the jurisdiction. For example, if the encrypted private key is stored in a key vault in the United States, the location is United States. However, if the encrypted private key is stored in France, resource transfer system 102 may determine the location is France.

Resource transfer system 102 may identify, based on the user identifier, that a third cryptography-based storage application is associated with the first user and corresponds to the second jurisdiction. The system may query its database using the user's identifier to locate additional cryptography-based storage applications linked to the same user. Upon finding the third application, the system may confirm its association with the second jurisdiction by examining its registration details.

Resource transfer system 102 may generate a second blockchain operation to transfer controls of resources from the third cryptography-based storage application to the second cryptography-based storage application. The system may create a separate blockchain transaction to move the assets from the cryptographic wallet in the second jurisdiction to the recipient's cryptographic wallet. This operation may be structured to comply with the regulatory requirements of both jurisdictions involved in the transfer.

Users may have more control over which cryptographic wallets are used for transactions. The resource transfer system may allow users to specify which wallets or jurisdictions to use for a transaction. For instance, when initiating a transfer, a user interface may present options for selecting specific cryptography-based storage applications associated with different jurisdictions. Users may choose to distribute a large transfer across multiple wallets in different jurisdictions, or they may prefer to use a cryptographic wallet in a specific jurisdiction for regulatory purposes. The system may then process the transaction according to the user's specified preferences, potentially generating multiple blockchain operations if the transfer involves wallets in different jurisdictions.

As discussed above, the resource transfer system may implement a multi-signature approach for enhanced security. This approach may require multiple parties to sign off on a transaction before it can be executed. For example, a high-value transfer might require approval from both the user and a designated company representative. The system may generate separate signature requests for each required party and only proceed with the blockchain operation once all necessary signatures have been collected and verified.

The resource transfer system may also incorporate adaptive security measures based on transaction patterns and risk assessments. For instance, the system may automatically adjust security thresholds or require additional verification steps for transactions that deviate significantly from a user's typical behavior. This could involve implementing temporary transfer limits, requiring additional identity verification, or triggering manual review by security personnel for unusually large or frequent transactions.

The resource transfer system may also offer features for managing and reconciling transactions across multiple blockchains. For users who hold cryptographic resources on different blockchain networks, the system may provide a unified interface for initiating cross-chain transfers. This could involve integrating with specialized cross-chain protocols or implementing atomic swap mechanisms to ensure the security and integrity of transfers between different blockchain ecosystems.

In some cases, the resource transfer system may implement a tiered access control system for managing cryptographic keys. This system may define different levels of access and permissions for various user roles within an organization. For example, certain employees may have permission to initiate transactions up to a specific value threshold, while higher-level approvals may be required for transactions exceeding that threshold. The system may enforce these access controls through smart contract logic or by integrating with enterprise identity and access management systems.

In some embodiments, the resource transfer system may support the creation and management of time-locked transactions. This feature may allow users to schedule future transfers or set up recurring transactions. The system may securely store the encrypted private keys and transaction details, only decrypting and executing the transaction at the specified time. This functionality could be particularly useful for businesses that need to manage regular payments or for implementing vesting schedules for cryptographic assets.

The resource transfer system may also incorporate advanced key recovery mechanisms to mitigate the risk of lost or compromised private keys. This could involve implementing a multi-party computation (MPC) protocol for key generation and storage, where no single party has access to the complete private key. In the event of key loss or compromise, the system may provide a secure process for key regeneration or replacement, potentially involving multiple authorized parties to ensure the integrity of the recovery process.

In some aspects, resource transfer system 102 may receive a request to transfer control of a specific quantity of cryptographic resources from one user to another. This request may include information about the source user, the target user, and the amount of resources to be transferred. Resource transfer system 102 may retrieve an encrypted key object associated with the source user from a secure storage location. This encrypted key object may represent a private key and may be composed of multiple encrypted key shards. For instance, resource transfer system 102 may access a key vault using a unique identifier for User A and retrieve an encrypted object that contains three separate encrypted key shards. Resource transfer system 102 may then send a command to a first security device to decrypt the encrypted key object. The first security device may perform the decryption process, transforming the encrypted key object into a set of encrypted key shards. As an example, the first security device may use a specialized decryption algorithm to decrypt the single encrypted object into three distinct encrypted key shards.

After the decryption process, resource transfer system 102 may receive the set of encrypted key shards from the first security device. These encrypted key shards collectively may represent the private key associated with the source user (e.g., User A). For instance, resource transfer system 102 may obtain three encrypted key shards, each containing a portion of the information needed to reconstruct the full private key and/or generate a signature for a blockchain operation/transaction. Resource transfer system 102 may then transmit the set of encrypted key shards to a second security device, along with instructions to generate a cryptographic signature. This signature may be used to authorize the blockchain operation. For example, resource transfer system 102 may send the three encrypted key shards to an MPC with a request to create a digital signature for the transfer transaction. Based on the initial request and the generated cryptographic signature, resource transfer system 102 may create a blockchain operation. This operation may be designed to transfer control of the specified cryptographic resources. Finally, resource transfer system 102 may send the completed blockchain operation to a node on the blockchain network. This node may use the cryptographic signature to verify and authorize the operation.

Resource transfer system 102 may receive a request to transfer control of cryptographic resources between users. Specifically, communication subsystem 112 may receive a request 200 to transfer control of a first number of cryptographic resources from a first user to a second user. For example, request 200 may include a source user identifier 203, a target user identifier 206, a resource quantity 209, and a resource type 212 specifying details of the resources. In some embodiments, the request may include some but not all of a source user identifier 203, a target user identifier 206, a resource quantity 209, and a resource type 212 specifying details of the resources.

Resource transfer system 102 may retrieve an encrypted key object associated with the first user from a secure storage location. Specifically, signature generation subsystem 116 may retrieve, from a key vault using a user identifier associated with the first user, an encrypted key object that represents a private key. The encrypted key object may include a plurality of encrypted key shards. For example, as shown in FIG. 3B, a key shard storage data structure 310 may store encrypted shards 315 associated with each corresponding user identifier 312. As discussed above, the encrypted key object may be located in a database or in another data structure and may be located based on a user identifier. Thus, signature generation subsystem 116 or another suitable component of resource transfer system 102 may send a query to a database or another system holding the encrypted key objects. In some embodiments, the database or another suitable storage system may be located in data node 104.

Resource transfer system 102 may transmit a command to decrypt the encrypted key object to a security device (first level of encryption). Specifically, signature generation subsystem 116 may transmit, to a first security device, a decryption command to decrypt the encrypted key object. In response, the first security device may decrypt the encrypted key object into the plurality of encrypted key shards. For example, the first security device may be a hardware security module (HSM) that uses a specialized decryption algorithms to decrypt the encrypted key object and separate the encrypted key object into multiple encrypted key shards. The HSM may store a decryption key for this particular encrypted key object. The decryption key may have been generated when a user account for the corresponding user has been created. Furthermore, the decryption key may be stored in association with a user identifier and/or in association with a public key for performing blockchain operations. That is, the public key may be a part of the private/public key pair that blockchain nodes use to sign and verify blockchain operations/transactions.

Resource transfer system 102 may receive the decrypted key shards from the security device. Specifically, signature generation subsystem 116 may receive, from the first security device, the plurality of encrypted key shards representing the private key. For example, communication subsystem 112 may receive three separate encrypted key shards that collectively represent the private key for the first user. Communication subsystem 112 may pass the encrypted key shards to signature generation subsystem 116. The encrypted key shards may be encrypted portions of the private key used to sign blockchain transactions/operations. The different encrypted key shards may be received as separate files/data structures or together as one file/data structure.

Resource transfer system 102 may transmit the key shards to another security device to generate a signature (second level of encryption). Specifically, signature generation subsystem 116 may transmit, to a second security device, the plurality of encrypted key shards and a command to generate a cryptographic signature for signing a blockchain operation. For example, signature generation subsystem 116 may send the encrypted key shards to a multi-party computation (MPC) system to generate a partial signature from each shard. The second security device (e.g., the MPC) may send the different key shards to different nodes (e.g., the nodes the key shards were encrypted on) for decryption and partial signature generation. Accordingly, each node may decrypt a corresponding key shard (e.g. using a decryption key generation during shard creation) and generate a portion of the signature based on the corresponding key shard. The second security device may then transmit the partial cryptographic signatures to resource transfer system 102 (e.g., via communication subsystem 112).

Resource transfer system 102 may create a blockchain operation using the request and the cryptographic signature. Specifically, blockchain operation subsystem 118 may generate the blockchain operation based on the request and the cryptographic signature. The cryptographic signature may be used by a blockchain node of a blockchain to authorize the blockchain operation. For example, blockchain operation subsystem 118 may create a blockchain operation 500 including a source address field 503, a target address field 506, a cryptographic signature field 509, and a parameter field 512.

The blockchain operation may be a blockchain transaction on a particular blockchain network. Creating a blockchain transaction involves several steps that ensure the transaction is properly formatted and authorized. First, the system may construct the transaction data structure by populating the source address field 503 with the sender's blockchain address, the target address field 506 with the recipient's blockchain address, and any other (e.g., in parameter field 512) with transaction details such as the amount to transfer and any additional metadata. The system may then generate a transaction hash by applying a cryptographic hash function to the transaction data. In some embodiments, the transaction hash may be generated prior to the cryptographic signature and the cryptographic signature process may involve encrypting the transaction hash. Thus, the cryptographic signature may be created using the shards. The completed cryptographic signature may then be inserted into the cryptographic signature field 509. The system may also include additional fields such as transaction fees, nonce values to prevent replay attacks, and gas limits for networks that require computational resource allocation. Once all fields are populated and the transaction is properly signed, the blockchain operation 500 is formatted according to the specific protocol requirements of the target blockchain network, such as Bitcoin, Ethereum, or other blockchain platforms, before being transmitted to blockchain nodes for validation and inclusion in the blockchain.

Resource transfer system 102 may send the blockchain operation to the blockchain network. Specifically, resource transfer system 102 may transmit the blockchain operation to the blockchain node. For example, communication subsystem 112 may transmit blockchain operation 500 to a node on the relevant blockchain network to be validated and added to the blockchain.

In some embodiments, resource transfer system 102 may process each encrypted key shard to generate corresponding portions of a cryptographic signature for blockchain operations. Each key shard of the plurality of encrypted key shards, when decrypted, may be used to generate a corresponding portion of the cryptographic signature for the blockchain operation to transfer control of the first number of cryptographic resources to be controlled by the second user. For example, signature generation subsystem 116 may coordinate the decryption and signature generation process across multiple security components.

Resource transfer system 102 may distribute encrypted key shards to corresponding decryption nodes for processing. Each encrypted key shard may be transmitted to a specific node that contains the appropriate decryption key for that particular shard. For instance, signature generation subsystem 116 may send a first encrypted key shard to a first done, a second encrypted key shard to the second node, and a third encrypted key shard to the third node. Each node may decrypt the received encrypted key shard using a decryption key that was generated during the initial key shard creation process.

Resource transfer system 102 may generate partial cryptographic signatures from each decrypted key shard. After decryption, each node may use the decrypted key shard to compute a partial signature for the blockchain operation. The first node may generate a first partial signature using the first decrypted key shard, the second node may generate a second partial signature using the second decrypted key shard, and the third node may generate a third partial signature using the third decrypted key shard. Each partial signature may represent a portion of the complete cryptographic signature needed to authorize the blockchain operation.

Resource transfer system 102 may combine the partial signatures to form a complete cryptographic signature. Blockchain operation subsystem 118 may receive the partial signatures from nodes (e.g., via communication subsystem 112). Blockchain operation subsystem 118 may then combine the partial signatures using cryptographic combination algorithms to produce a single, complete cryptographic signature that may be used to sign the blockchain operation for transferring control of cryptographic resources.

Resource transfer system 102 may handle the creation of new user accounts through a comprehensive key generation and storage process. Resource transfer system 102 may receive a new account generation request for a new user. For example, communication subsystem 112 may receive a request from a cryptography-based storage application to establish a new account for a user who wants to participate in cryptographic resource transfers. In some embodiments, the new account generation request may include a user identifier of the user so that the new generated keys are stored in associated with that user identifier.

Resource transfer system 102 may initiate the key generation process by communicating with security devices. Specifically, signature generation subsystem 116 may transmit a key generation request to the second security device. The key generation request may include a request to generate a public and private key for the user to be used in blockchain operations in a particular blockchain. The key generation request may also request a cryptographic wallet address from the second security device and/or derive the cryptographic wallet address from the public key. The second security device may generate a new private key and a new public key for the new user. The second security device may generate the new private key as a new plurality of key shards (e.g., each node of the second security device may generate a corresponding key shard). Each corresponding node may also encrypt a corresponding new key shard, generating a new encrypted plurality of key shards using a corresponding first encryption key generated at each node. For example, the second security device may be a multi-party computation system that creates, based on a command/request a private-public key pair suitable for blockchain operations, divides the private key into three separate shards, and distributes each shard to a different computational node where each node applies encryption using node-specific encryption keys.

In some embodiments, the key generation request may include an identifier of the blockchain for which the keys are generated. That is, some blockchain may have different requirements for public/private key pairs. Furthermore, in certain instances the key generation request may include a number of shards desired to be generated.

Resource transfer system 102 may collect the encrypted key materials from the security devices. Specifically, signature generation subsystem 116 may receive the new encrypted plurality of key shards and the new public key from the second security device. For example, communication subsystem 112 may receive three encrypted key shards along with the corresponding public key that will be used for blockchain address generation and transaction verification. In some embodiments, resource transfer system 102 may receive a cryptographic wallet address for the user. However, in some embodiments, resource transfer system 102 may compute the cryptographic wallet address based on the public key received.

Resource transfer system 102 may apply an additional layer of encryption to the key shards for enhanced security. Specifically, signature generation subsystem 116 may transmit the new encrypted plurality of key shards to the first security device with an encryption command to encrypt the new encrypted plurality of key shards into a new encrypted private key. The first security device may encrypt the new plurality of key shards into the new encrypted private key using a second encryption key that may be generated on the first security device. For example, the first security device may be a hardware security module that applies a second layer of encryption to the already-encrypted key shards, creating a doubly-encrypted key object that provides enhanced protection against unauthorized access.

Resource transfer system 102 may store the encrypted key materials in a secure database system. Specifically, signature generation subsystem 116 may transmit the new encrypted private key to a database server that stores the new encrypted private key in the key vault. For example, communication subsystem 112 may send the doubly-encrypted key object to data node 104 where the encrypted key materials may be stored in association with the new user's identifier for future retrieval during cryptographic resource transfer operations.

Resource transfer system 102 may implement a jurisdiction-based storage approach for managing encrypted key objects across multiple geographic locations. This approach may allow the system to comply with regulatory requirements and data sovereignty laws by storing user cryptographic materials in appropriate jurisdictions. Resource transfer system 102 may analyze user information to determine the proper storage location and may select from multiple available database servers based on jurisdictional requirements.

Resource transfer system 102 may then determine a user's geographic location and corresponding legal jurisdiction based on user data associated with the user. Specifically, signature generation subsystem 116 may retrieve user data associated with the new user and may determine based on the user data associated with the user a user's location. The user's location may include a jurisdiction of the user. For example, signature generation subsystem 116 may analyze user registration information, account details, or other identifying data to determine that a user is located in Brazil, China, or the United States, with each location corresponding to a specific legal jurisdiction with particular data storage requirements.

Resource transfer system 102 may identify an appropriate database server from multiple servers distributed across different jurisdictions. Specifically, signature generation subsystem 116 may identify, based on the user's location, a database server within the jurisdiction of the user. The database server may be one of a plurality of database servers active in a plurality of different jurisdictions. For example, as shown in FIG. 4A, a vault system 400 may include a first key vault 403, a second key vault 409, and a third key vault 412, where each key vault may be located in a different jurisdiction such as Brazil, China, and the United States respectively, and signature generation subsystem 116 may select the appropriate key vault based on the determined user jurisdiction.

Resource transfer system 102 may transmit the encrypted key materials to the selected jurisdiction-specific database server. Specifically, signature generation subsystem 116 may transmit the new encrypted private key to the database server identified based on the jurisdiction corresponding to the user. For example, communication subsystem 112 may send the doubly-encrypted key object to the first key vault 403 if the user is determined to be in the Brazilian jurisdiction, to the second key vault 409 if the user is in the Chinese jurisdiction, or to the third key vault 412 if the user is in the United States jurisdiction, ensuring that the encrypted key materials are stored in compliance with local data sovereignty requirements.

Resource transfer system 102 may coordinate with a hot vault 415 for operational processing while maintaining jurisdiction-specific storage. The hot vault 415 may receive inputs from the first key vault 403, the second key vault 409, and the third key vault 412 as shown in vault system 400. For example, when processing a cryptographic resource transfer request, the hot vault 415 may retrieve encrypted key objects from the appropriate jurisdiction-specific key vault and may perform the necessary decryption and signature generation operations while ensuring that the permanent storage remains within the user's designated jurisdiction.

In Some embodiments, resource transfer system 102 may implement a process for extracting user identification information from incoming requests and using that information to locate the appropriate cryptographic materials. The resource transfer system 102 may parse incoming requests to identify the user who is initiating a cryptographic resource transfer operation. Specifically, the signature generation subsystem 116 may retrieve, from the request 200, the user identifier associated with the first user. For example, the communication subsystem 112 may extract the source user identifier 203 from the request 200 by parsing the request data structure and isolating the field containing the user identification information.

The resource transfer system 102 may communicate with secure storage systems to locate user-specific encrypted materials. The resource transfer system 102 may send queries to database systems to retrieve cryptographic objects associated with particular users. Specifically, signature generation subsystem 116 may transmit, to the key vault, the user identifier associated with the first user. For example, signature generation subsystem 116 may send the extracted user identifier to the data node 104 containing the key shard storage data structure 310, where the user identifier 312 may be used as a lookup parameter to locate the corresponding encrypted shards 315 associated with that specific user.

Resource transfer system 102 may receive cryptographic materials from the storage systems based on the user identification lookup process. Resource transfer system 102 may obtain encrypted key objects that correspond to the specified user identifier from the secure storage location. Specifically, signature generation subsystem 116 may receive, from the key vault, the encrypted key object associated with the first user. For example, communication subsystem 112 may receive the encrypted shards 315 from the key shard storage data structure 310 after the data node 104 performs a database query using the user identifier 312 as the search parameter, returning the encrypted key materials that correspond to the first user's cryptographic resources.

Resource transfer system 102 may implement a multi-party signature aggregation process to create complete cryptographic signatures from distributed partial signatures. This approach may enhance security by ensuring that no single component possesses the complete signing capability while still enabling authorized blockchain operations. Resource transfer system 102 may coordinate the collection and combination of signature fragments generated by multiple security nodes to produce a unified cryptographic signature suitable for blockchain validation.

Resource transfer system 102 may collect partial cryptographic signatures from distributed security components. Specifically, signature generation subsystem 116 may receive, from the second security device, a plurality of portions of the cryptographic signature generated based on the plurality of encrypted key shards. The cryptographic signature may be used to cryptographically sign the blockchain operation. For example, communication subsystem 112 may receive three separate partial signatures from an MPC system, where each partial signature corresponds to a different encrypted key shard that was processed by a different computational node, and each partial signature represents a mathematically valid fragment of the complete signature needed to authorize the blockchain transaction.

Resource transfer system 102 may aggregate the collected signature fragments into a unified cryptographic signature. Specifically, signature generation subsystem 116 may combine the plurality of portions of the cryptographic signature into the cryptographic signature. For example, signature generation subsystem 116 may apply cryptographic combination algorithms to merge the three partial signatures received from the MPC nodes, using mathematical operations such as elliptic curve point addition or modular arithmetic to reconstruct the complete signature that corresponds to the original private key, thereby producing a single valid cryptographic signature that blockchain nodes can use to verify the authenticity and authorization of the resource transfer operation.

FIG. 4C illustrates a block diagram of cold storage system 440 for controlling access to cryptographic resources. Cold storage system 440 may include internal network 443 that is disconnected from external network 446. Cold storage system 440 may further include security device 462 storing encrypted private keys for blockchain operations. The security device may be located within a vault connected to internal network 443. The vault may include a hardware security module (HSM) and multiparty computation capabilities for cryptographic operations. For example, the vault may be a room, a building, or another suitable location, with internal network 443 only existing within that location. That is, internal network 443 may not be connected with the outside world and may only include devices connected to that network. In some embodiments, internal network 443 may be wired only. However, in some embodiments, internal network 443 may be wireless or a combination of wired and wireless as long as that network is isolated from other networks.

First secure bypass switch 449 may connect receiver computing device 452 to the external network 446 or to the internal network 443. Second secure bypass switch 459 may connect a sender computing device 456 to external network 446 or to internal network 443. That is, each of the first secure bypass switch 449 and the second secure bypass switch 459 may physically switch a corresponding network connection of a corresponding computing device between external network 446 and internal network 443. Accordingly, external network 446 and internal network 443 may be physically prevented from being simultaneously connected to each computing device using an air gap. In some embodiments, these connections may be wired connections.

Receiver computing device 452 may be coupled (e.g., via the internal network or directly connected) to the security device and first secure bypass switch 449. Receiver computing device 452 may receive a transfer request while connected to the external network 446. In some embodiments, the transfer request may include a user identifier and a hash of a blockchain operation to transfer control of a number of cryptographic resources from a first user to a second user. For example, the transfer request may request transferring one thousand eth from one cryptographic wallet associated with a first user to another cryptographic wallet associated with a second user.

In response to receiving the transfer request (e.g., the request to transfer cryptographic tokens such as eth, bitcoin, etc.), receiver computing device 452 may transmit a first command to first secure bypass switch 449 to switch from external network 446 to internal network 443. Subsequently, receiver computing device 452 may transmit a signature request to the security device on the internal network 443. The signature request may request generation of a cryptographic signature for the blockchain operation using the hash and the user identifier.

Security device 462 may decrypt a private key associated with the user identifier and generate the cryptographic signature using the hash. The security device may then transmit the cryptographic signature to the sender computing device 456. The decryption process may use a decryption key stored on the security device. The decryption key may be a symmetrical key that was used to encrypt the private key. In some embodiments, the decryption key may be a private key that is part of a pair with a public key that was used to encrypt the private key to be used for blockchain operations. In some embodiments, the private key used for blockchain operations may have been double encrypted as described above.

Security device 462 may decrypt the private key and generate the cryptographic signature. in some embodiments, the security device may generate portions of signatures from portions of private keys, as described above. Security device 462 may transmit the signature to sender computing device 456 or publish the signature so that sender computing device 456 is able to retrieve the cryptographic signature. Once sender computing device 456 receives or retrieves the cryptographic signature on the internal network, sender computing device 456 may instruct the second secure bypass switch 459 to switch the corresponding network connection from the internal network 443 to the external network 446. The sender computing device 456 may then transmit the cryptographic signature to the external network 446.

This system architecture may enable secure transaction processing by maintaining physical separation between the external network 446 and internal network 443 through the secure bypass switches and unidirectional data diodes. The non-persistent storage in the computing devices may help prevent data persistence between operations. For example, the operations may be performed in non-persistent storage (e.g., memory) so that they can be overwritten or otherwise will disappear as necessary (e.g., when a computing device is shut down or restarted).

The resource transfer system may receive a request to create a new account for a user while connected to an external network. Specifically, a receiver computing device may receive, while connected to the external network, a new account generation request to generate a new account for a new user. For example, the receiver computing device (which may host at least part of the resource transfer system) may receive an API call or message from a client application or server requesting creation of a new blockchain wallet account for a particular blockchain (e.g., Ethereum, bitcoin network, etc.).

The resource transfer system may switch its network connection to access secure components. Specifically, the receiver computing device may transmit, to a first secure bypass switch, a switching command to connect the receiver computing device to an internal network. For example, the receiver computing device may send an electronic signal to the first secure bypass switch instructing it to physically switch the network connection from the external network to the internal network.

The resource transfer system may send instructions to generate cryptographic keys for the new account. Specifically, in response to connecting to the internal network, the receiver computing device may transmit an account generation command to the security device. The new account generation request may include one or more commands to generate a new private key and a new public key for the new user. For example, the receiver computing device may send a message to the security device containing parameters for generating an elliptic curve key pair for use with a particular blockchain network.

The resource transfer system may notify the requestor that the new account is ready for use. Specifically, the sender computing device may transmit an indication that the new account has been created. In some embodiments, the indication may include the new public key. For example, the sender computing device may send a response message back to the client application containing the newly generated public key address for the blockchain wallet account. In particular, the security device (e.g., in response to a command from a receiver computing device) may generate the public and private keys compatible with a particular blockchain network (e.g., Ethereum, bitcoin, etc.) and publish the public key for the sender computing device to retrieve that public key. In some embodiments, the security device may transmit a notification to the sender computing to retrieve the public key. In yet some embodiments, the security device may transmit the public key to the sender computing device to be sent out to the external network.

The resource transfer system may generate multiple portions of a cryptographic key for enhanced security. Specifically, the resource transfer system may generate a shard generation command to generate a plurality of cryptographic key shards using a security device. Each cryptographic key shard of the plurality of cryptographic key shards may enable generation of a partial cryptographic signature that signs one or more blockchain operations. For example, the resource transfer system may send a command to the security device to generate a private key as 3 separate shards. Each shard may contain partial information needed to generate a portion of a transaction signature. In some embodiments, the resource transfer system may be able to reconstruct the full private key from the separate shards. For example, the security device may host multiple MPC nodes with each MPC node generating and storing a corresponding shard.

The resource transfer system may protect the key shards through encryption. Specifically, the resource transfer system may generate an encryption command that instructs the security device to encrypt each cryptographic key shard of the plurality of cryptographic key shards. For example, the resource transfer system may send a command to the security device to apply AES-256 encryption to each of the generated key shards using a unique encryption key for each shard. For example, the security device may be coupled with an HSM that may encrypt the cryptographic shards to be stored.

The resource transfer system may transmit instructions to create and secure the cryptographic key components. Specifically, the resource transfer system may transmit the shard generation command and the encryption command to the security device. The security device may generate the new private key that may include the plurality of cryptographic key shards and encrypt each cryptographic key shard. For example, the security device may generate a new 256-bit private key that may have 3 parts with each part generated at a particular MPC node.

The resource transfer system may utilize partial signatures for enhanced security of blockchain operations. Specifically, each cryptographic key shard of the plurality of cryptographic key shards may enable generation of a partial cryptographic signature that signs one or more blockchain operations. For example, when signing a blockchain transaction, the resource transfer system may retrieve and decrypt the key shards, generate partial signatures using each shard, and then combine the partial signatures to create a complete valid signature for the transaction without ever reconstructing the full private key.

The resource transfer system may receive a request to create a new account that specifies the target blockchain network. Specifically, the new account generation request may include an identifier of a blockchain network indicating a type of keys required. For example, the request may contain a parameter specifying "ethereum" to indicate Ethereum-compatible keys should be generated, or "bitcoin" to indicate Bitcoin-compatible keys are needed.

The system may use this blockchain network identifier to determine the appropriate key generation algorithm and parameters. For instance, if the identifier specifies Ethereum, the system may generate secp256k1 elliptic curve key pairs. If Bitcoin is specified, the system may generate key pairs using the ECDSA algorithm with the secp256k1 curve. By including the blockchain network identifier in the request, the system may ensure the correct type of cryptographic keys are created for the intended blockchain. This allows the resource transfer system to support multiple blockchain networks while generating keys that are compatible with each network's specific requirements.

The resource transfer system may request and receive a new public key as part of the account creation process. Specifically, the account generation command may include a request to return the new public key. For example, when an account generation command is received by a security device 462 on the internal network 443, the command may include a parameter requesting that the newly generated public key be returned along with confirmation of account creation.

The resource transfer system may utilize the new public key to establish a blockchain presence for the account. Specifically, the new public key may be used to generate a cryptographic address on a corresponding blockchain. For example, the returned public key may be used while applying a hashing algorithm (such as SHA-256 for Bitcoin or Keccak-256 for Ethereum) to derive a unique blockchain address. This address may serve as the account's identifier on the blockchain network, allowing it to send and receive transactions.

In some cases, the process of generating the cryptographic address may involve additional steps beyond simple hashing. For instance, the system may prepend a version byte to the hashed public key, calculate a checksum, and encode the result in base58 format to create a Bitcoin address. For Ethereum addresses, resource transfer system 102 may take the last 20 bytes of the Keccak-256 hash of the public key and represent it as a hexadecimal string prefixed with "0x". Once the cryptographic address is generated, the system may store it in association with the user's account information in data node 104. This may allow for easy retrieval and use of the address in future blockchain operations initiated by the user through the resource transfer system.

The resource transfer system may reside on one or more devices that are isolated from external networks for enhanced protection of sensitive data. Specifically, a security device may be connected to the internal network only and may be isolated from other networks. For example, the security device may be physically located within a secure vault that has no direct connections to any networks outside of the internal network. Furthermore, the internal network may be a closed system that is not accessible from the external network. In some cases, the internal network may use dedicated wiring and hardware that is physically separate from other network infrastructure. This physical separation may prevent unauthorized access attempts from external sources.

The security device may store cryptographic keys, perform encryption and decryption operations, and generate digital signatures. By isolating the security device on the internal network, the resource transfer system may protect these critical security functions from potential network-based attacks.

In some cases, all communication with the security device may be mediated through secure bypass switches and computing devices on the internal network. For example, a computing device on the internal network may retrieve encrypted data from the security device, process it as needed, and then pass the results to another computing device for transmission to the external network via a secure bypass switch. This multi-step process with air gaps between networks may provide multiple layers of protection for the sensitive operations performed by the security device. Furthermore, the isolation of the security device may allow the resource transfer system to maintain strict control over access to cryptographic keys and other security-critical data. By keeping this sensitive information confined to the internal network, the resource transfer system may significantly reduce the attack surface available to potential adversaries attempting to compromise the system.

Figure 4B:
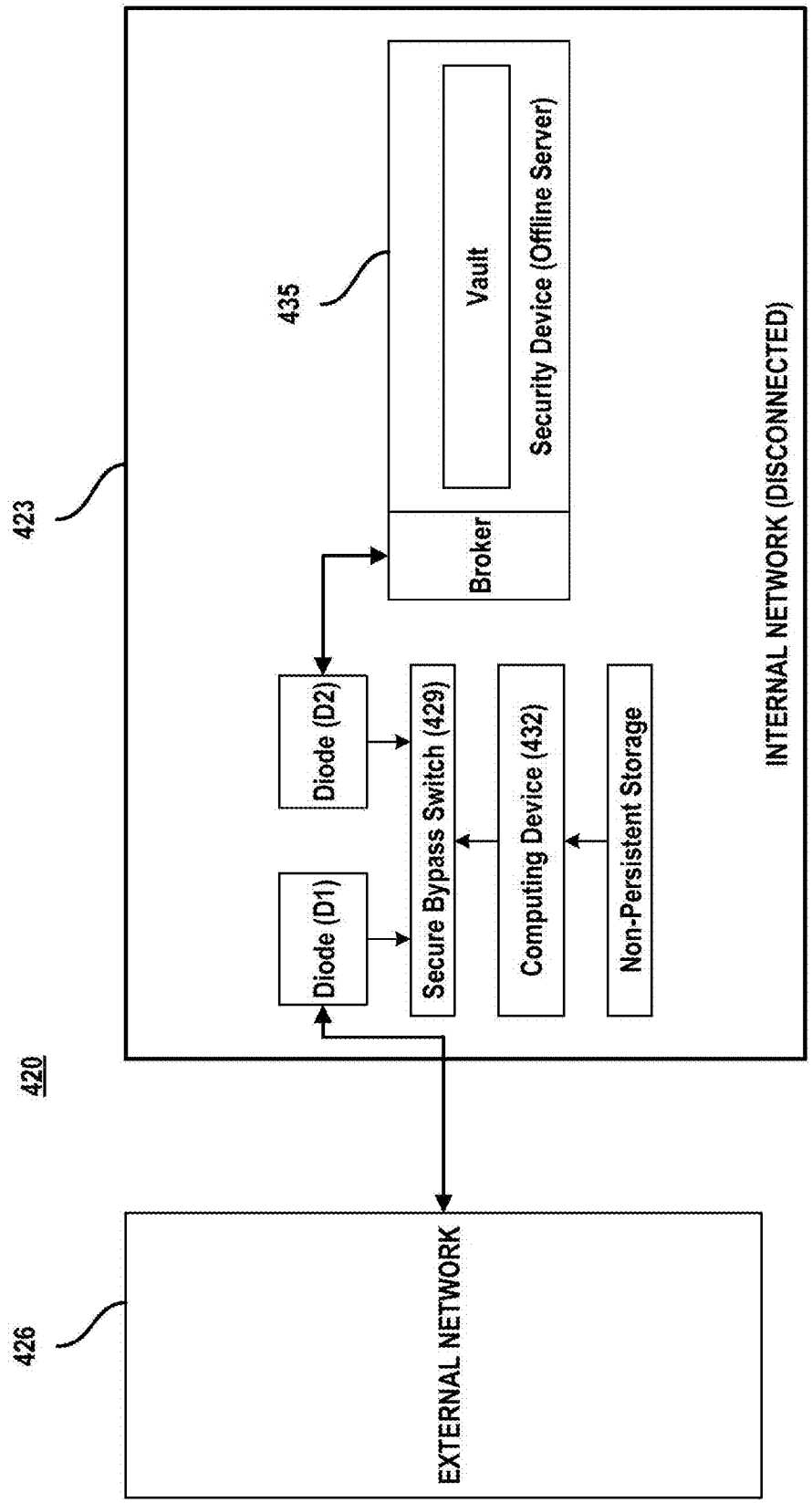
FIG. 4B illustrates a block diagram of a cold storage environment, in accordance with example embodiments.

In some embodiments, cold storage may include a single computing device instead of a receiver computing device and a sender computing device. FIG. 4B illustrates cold storage system 420 that may be used for this purpose. Cold storage system 420 may include computing device 432 coupled to security device 435 and secure bypass switch 429.

Resource transfer system 102 may receive a transfer request while connected to an external network. Specifically, computing device 432 may receive, while connected to external network 426, a transfer request to transfer control of a number of cryptographic resources from a first user to a second user. In some embodiments, the transfer request may include a user identifier and a transaction hash of a blockchain operation. For example, the transfer request may contain a unique identifier of the user's account so that they private and public keys can be stored in association with the corresponding user. The transaction hash may include the proposed blockchain transaction details or may simply be a nonce for generating the cryptographic signature.

As described above, resource transfer system 102 may switch network connections to access secure components. Specifically, in response to receiving the transfer request, computing device 432 may transmit a first command to secure bypass switch 429 to switch the network connection from external network 426 to internal network 423. For example, computing device 432 may send an electronic signal instructing secure bypass switch 429 to physically disconnect from external network 426 and connect to internal network 423.

Resource transfer system 102 may request generation of a cryptographic signature on the secure network. Specifically, subsequently to transmitting the first command, computing device 432 may transmit to security device 435 on internal network 423, a signature request requesting generation of a cryptographic signature for the blockchain operation using the transaction hash and the user identifier. For example, computing device 432 may send a message to security device 435 containing the transaction hash and user identifier, along with instructions to generate a digital signature. The transaction hash may be of a transaction requesting a large transfer of cryptographic tokens (e.g., one thousand eth), which may require extra security.

Resource transfer system 102 may process the signature request within the cold storage vault. Specifically, security device 435 may decrypt a private key associated with the user identifier and generate the cryptographic signature using the transaction hash. For example, security device 435 may retrieve an encrypted private key associated with the user identifier from secure storage, decrypt it using a stored decryption key, and then use the decrypted private key to digitally sign the transaction hash. In some embodiments, the private key may be generated as multiple key shards that may be encrypted or double-encrypted. As described above, in this disclosure, resource transfer system 102 (e.g., residing, at least partially on computing device 432) may generate three different partial signatures and combine those signatures.

Resource transfer system 102 may receive the generated cryptographic signature. Specifically, computing device 432 may receive from security device 435, the cryptographic signature. For example, security device 435 may transmit the generated digital signature back to computing device 432 over internal network 423.

Resource transfer system 102 may switch network connections to transmit the cryptographic signature to be used on a blockchain network. Specifically, in response to receiving the cryptographic signature, computing device 432 may transmit a second command to secure bypass switch 429 to switch the network connection from internal network 423 to external network 426. For example, computing device 432 may send another electronic signal instructing secure bypass switch 429 to disconnect from internal network 423 and reconnect to external network 426.

Resource transfer system 102 may transmit the cryptographic signature to complete the blockchain operation. Specifically, computing device 432 may transmit the cryptographic signature to a requesting device on external network 426. For example, computing device 432 may send the digital signature back to the original requester or to a blockchain node to be included in the finalized transaction.

In some embodiments, resource transfer system 102 may receive a request to create a new account for a user while connected to an external network. Specifically, resource transfer system 102 may receive, while connected to the external network, a new account generation request to generate a new account for a new user. For example, resource transfer system 102 may receive an API call or message from a client application or server requesting creation of a new blockchain wallet account for a particular blockchain network. For example, the request may be a request to generate a new account to be used with the Bitcoin network or the Ethereum network and may require creation of a public/private key pair.

Resource transfer system 102 may switch its network connection to access secure components. Specifically, resource transfer system 102 may transmit, to a secure bypass switch, a switching command to connect resource transfer system 102 to an internal network. For example, resource transfer system 102 may send an electronic signal to the secure bypass switch instructing it to physically switch the network connection from the external network to the internal network. In some embodiments, the secure bypass switch may include two diodes that may not be simultaneously connected.

Resource transfer system 102 may send instructions to generate cryptographic keys for the new account. Specifically, in response to connecting to the internal network, resource transfer system 102 may transmit an account generation command to a security device. The new account generation request may include one or more commands to generate a new private key and a new public key for the new user. For example, resource transfer system 102 may send a message to the security device containing parameters for generating an elliptic curve key pair for use with a particular blockchain network.

Resource transfer system 102 may notify the requestor that the new account is ready for use. Specifically, resource transfer system 102 may transmit an indication that the new account has been created. In some cases, the indication may include the new public key. For example, resource transfer system 102 may send a response message back to the client application containing the newly generated public key address for the blockchain wallet account. In another example, the computing device may publish the public key so that the public key may be retrieved by a device on the external network.

Resource transfer system 102 may generate multiple portions of a cryptographic key for enhanced security. Specifically, resource transfer system 102 may generate a shard generation command to generate a plurality of cryptographic key shards using a security device. Each cryptographic key shard of the plurality of cryptographic key shards may enable generation of a partial cryptographic signature that signs one or more blockchain operations. For example, resource transfer system 102 may send a command to the security device to generate a private key as 3 separate shards using multi-party computation (MPC) techniques. The resource transfer system may generate the shards using one or more MPCs as described above.

Resource transfer system 102 may protect the key shards through encryption. Specifically, resource transfer system 102 may generate an encryption command that instructs the security device to encrypt each cryptographic key shard of the plurality of cryptographic key shards. For example, resource transfer system 102 may send a command to the security device to apply encryption to each of the generated key shards using a unique encryption key for each shard.

Resource transfer system 102 may transmit instructions to create and secure the cryptographic key components. Specifically, resource transfer system 102 may transmit the shard generation command and the encryption command to the security device. The security device may generate the new private key, the new private key may be generated as the plurality of cryptographic key shards which may be encrypted. For example, the security device may generate a new private key as 3 shards using one or more MPC nodes, with each node encrypting each shard with a unique encryption key.

In some embodiments, resource transfer system 102 may receive a request to create a new account that specifies the target blockchain network. Specifically, the new account generation request may include an identifier of a blockchain network indicating a type of keys required. For example, the request may contain a parameter specifying "Ethereum" to indicate Ethereum-compatible keys should be generated, or "bitcoin" to indicate Bitcoin-compatible keys are needed.

Resource transfer system 102 may request and receive a new public key as part of the account creation process. Specifically, the account generation command may include a request to return the new public key. For example, when an account generation command is received by the security device on the internal network, the command may include a parameter requesting that the newly generated public key be returned along with confirmation of account creation.

Resource transfer system 102 may utilize the new public key to establish a blockchain presence for the account. Specifically, the new public key may be used to generate a cryptographic address on a corresponding blockchain. For example, the returned public key may be used while applying a hashing algorithm to derive a unique blockchain address.

Resource transfer system 102 may reside on one or more devices that are isolated from external networks for enhanced protection of sensitive data. Specifically, a security device may be connected to the internal network only and may be isolated from other networks. For example, the security device may be physically located within a secure vault that has no direct connections to any networks outside of the internal network. The internal network may include a switch and/or another suitable device but may not be connected to any other networks. In some embodiments, the devices within the internal network may be connected directly (e.g., via a wire) in such a way that there is no other network connectivity between the devices. For example, Diode 2 of FIG. 4B may be directly connected via a wire to security device 435. Thus, security device 435 may not be connected to any other components.

Resource transfer system 102 may receive a transfer request containing encrypted private key information. Specifically, the transfer request may include an encrypted private key for generating the cryptographic signature. For example, the transfer request may contain an encrypted version of the private key associated with the user's account, which is needed to sign the blockchain transaction. That is, the encrypted private key may be stored outside of the system and may be encrypted or double-encrypted. That is, the decryption and signature processes may be performed within the internal network. For example, as described above, the encrypted private key may be encrypted using an HSM within the internal network but may be stored outside the internal network. Thus, in some embodiments, only the decryption key may be stored within the internal network. In some embodiments, the internal network may include multiple MPCs that may have been used to encrypt different shards that which the private key comprises. In these embodiments, the system may decrypt the shards and send those shards to two or more corresponding MPCs within the internal network (e.g., as shown in FIG. 4C).

Resource transfer system 102 may extract the encrypted private key from the received request. Specifically, resource transfer system 102 may extract, from the transfer request, the encrypted private key. For example, resource transfer system 102 may parse the transfer request data to isolate and retrieve the encrypted private key field.

Resource transfer system 102 may instruct the security device to perform cryptographic operations using the decrypted private key. Specifically, resource transfer system 102 may transmit, to the security device, an instruction to sign the blockchain operation using a decrypted instance of the encrypted private key. For example, resource transfer system 102 may send a command to the security device to decrypt the encrypted private key using stored decryption keys and then use the decrypted key to generate a digital signature for the blockchain operation.

In some embodiments, resource transfer system 102 may utilize a combination of security technologies for key management. Specifically, resource transfer system 102 may combine hardware security module (HSM) and multi-party computation (MPC) techniques for managing cryptographic keys. For example, resource transfer system 102 may use an HSM to securely store encrypted private keys, while using MPC to generate and distribute key shards for additional security. In addition, resource transfer system 102 may enforce transaction rules and approvals. Specifically, resource transfer system 102 may include a policy engine for enforcing transaction rules and approvals. For example, the policy engine may check each outgoing transaction against predefined rules and require multiple approvals for high-value transfers.

Resource transfer system 102 may validate outgoing transactions for security. Specifically, resource transfer system 102 may include a risk engine for validating outgoing transactions. For example, the risk engine may analyze transaction patterns and flag unusual activity for further review.

Resource transfer system 102 may maintain an audit trail of transactions. Specifically, the internal network may contain an audit workstation for reviewing transactions. For example, authorized personnel may use the audit workstation to review transaction logs and investigate any suspicious activity.

Resource transfer system 102 may integrate with external services for enhanced security and compliance. Specifically, resource transfer system 102 may integrate with external compliance and analytics providers. For example, resource transfer system 102 may send transaction data to external services for additional risk analysis and regulatory compliance checks. In some instances, resource transfer system 102 may enforce strict data flow controls. Specifically, resource transfer system 102 may use unidirectional data diodes to enforce one-way data flow. For example, data diodes may be used to ensure that information can only flow from the internal network to the external network, but not vice versa.

Resource transfer system 102 may support multiple blockchain networks. Specifically, resource transfer system 102 may support multiple blockchain networks through distributed ledger technology (DLT) adapters. For example, DLT adapters may allow resource transfer system 102 to interact with different blockchain networks using a standardized interface. Furthermore, resource transfer system 102 may use temporary storage for sensitive operations. Specifically, resource transfer system 102 may use non-persistent storage that is wiped on reboot. For example, sensitive transaction data may be processed in memory that is automatically cleared when the system is restarted, reducing the risk of data exposure.

Computing Environment

Figure 6:
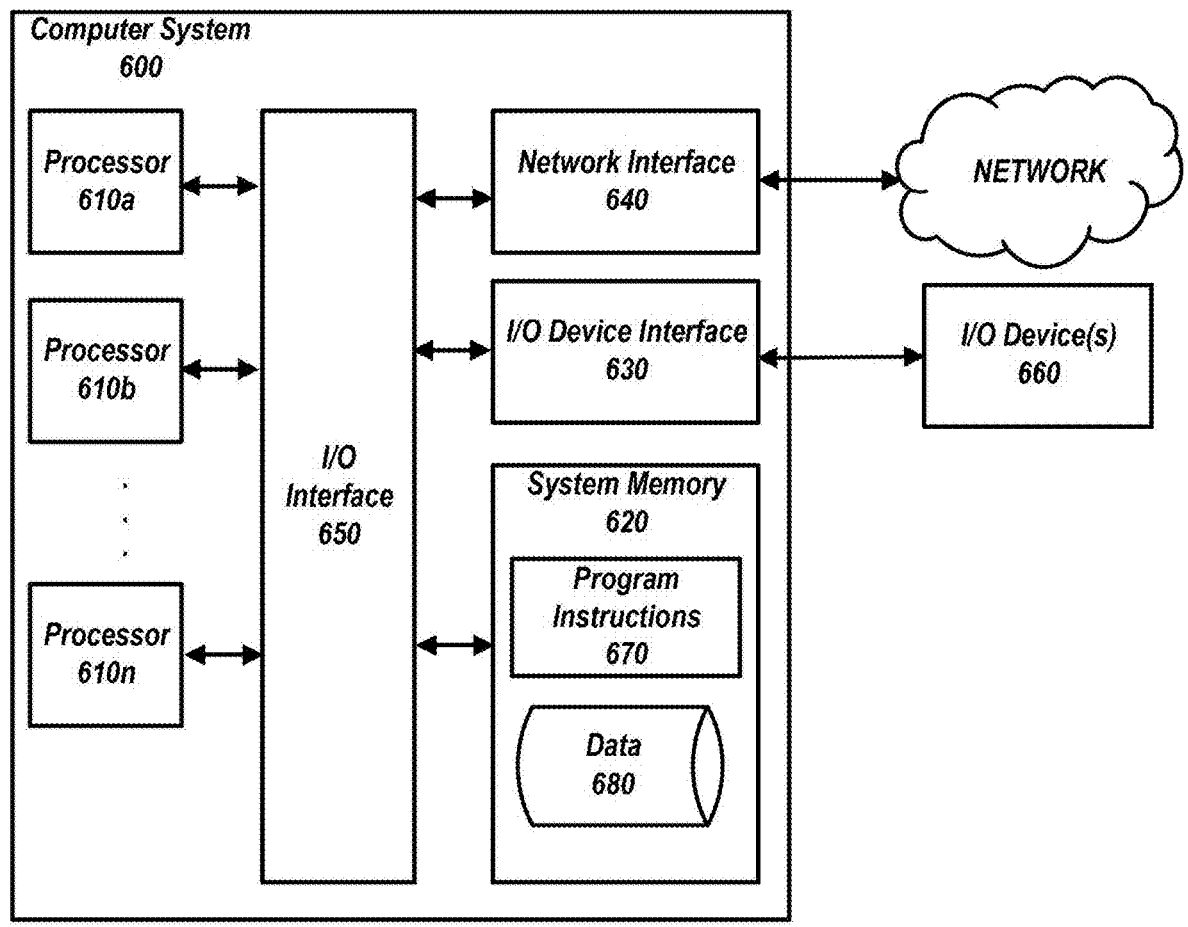
FIG. 6 illustrates a computing system, in accordance with example embodiments.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a or 610b), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Blockchain Environment

Figure 7:
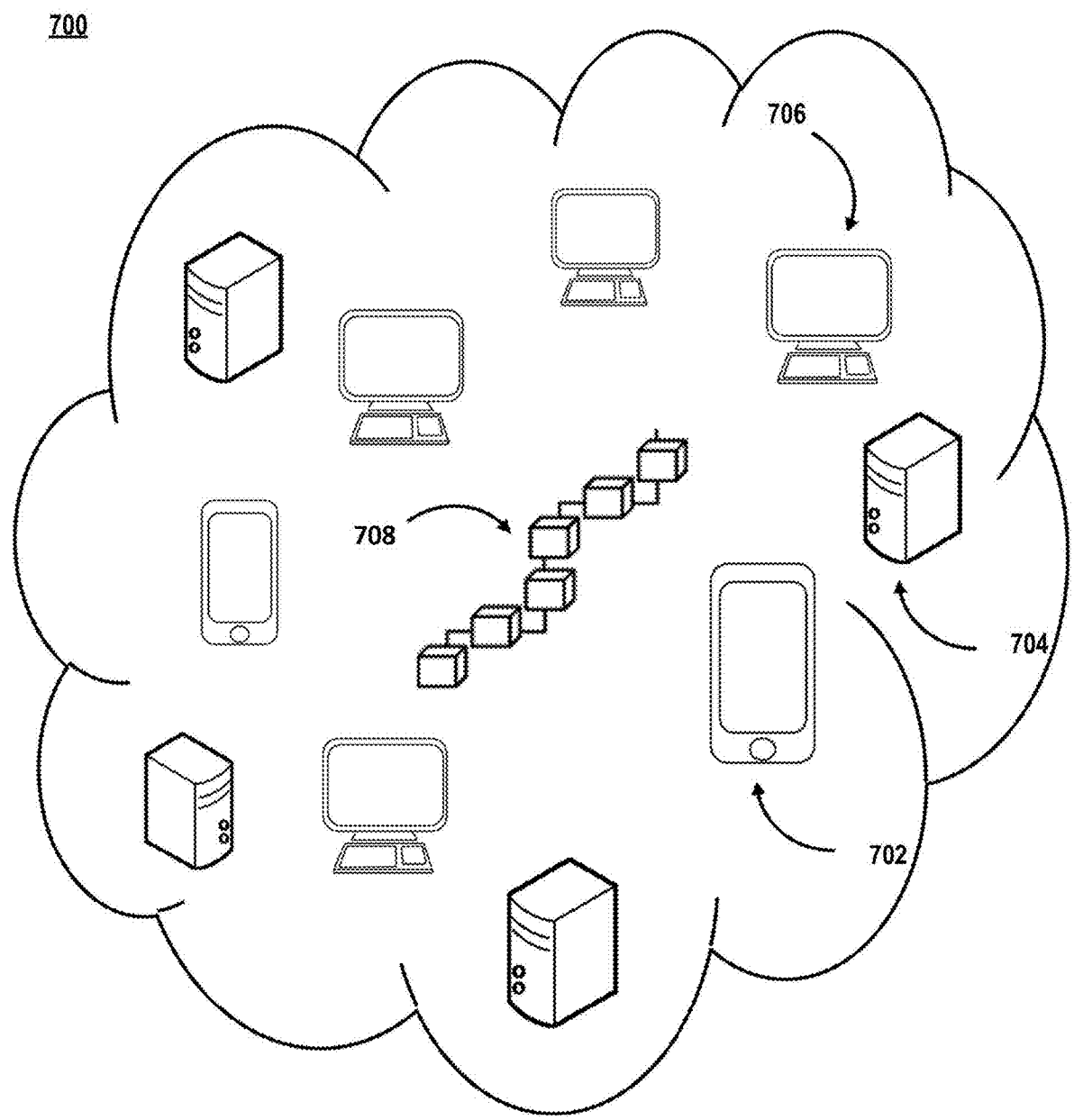
FIG. 7 shows an illustrative diagram for a decentralized environment for performing blockchain functions or operations, in accordance with example embodiments.

FIG. 7 shows an illustrative diagram for a decentralized environment for performing blockchain functions or operations, in accordance with one or more embodiments. For example, the diagram presents various components that may be used to allocate and distribute cryptographic resources in response to an off-chain trigger or event upon request, in some embodiments.

As shown in FIG. 7, system 700 may include multiple user devices (e.g., user device 702, user device 704, and/or user device 706). For example, system 700 may comprise a distributed state machine, in which each of the components in FIG. 7 acts as a client of system 700. For example, system 700 (as well as other systems described herein) may comprise a large data structure that holds not only all accounts and balances but also a state machine which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 700 may interact with, and facilitate the function of, blockchain 708.

It should be noted that, while shown as a smartphone, a personal computer, and a server in FIG. 7, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 700 performing a blockchain function may equally be applied to, and correspond to, an individual user device (e.g., user device 702, user device 704, and/or user device 706) performing the blockchain function. That is, system 700 may correspond to the user devices (e.g., user device 702, user device 704, and/or user device 706) collectively or individually.

Each of the user devices may be used by the system to conduct blockchain functions or operations and/or contribute to allocating and distributing cryptographic resources in response to an off-chain trigger or event upon request. As referred to herein, "blockchain functions" or "blockchain operations" may comprise any operations including and/or related to blockchains and blockchain technology. For example, blockchain functions or operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function or operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions or operations may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for enabling Turing-complete computation while limiting the resources that any smart contract and/or blockchain function may consume.

In some embodiments, gas may be obtained as part of a blockchain function or operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 7, one or more user devices may include a digital wallet (e.g., cryptography-based storage application described above) used to perform blockchain functions or operations. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the Internet while cold wallets are not. Most digital wallet holders hold both a hot wallet (e.g., residing on a computing device) and a cold wallet (residing on a device that is generally disconnected from a computing device and is not accessible until connected). Hot wallets are most often used to perform blockchain functions, while a cold wallet is generally used for managing a user account and may have no connection to the Internet.

One or more user devices may include a private key and a public key. In such cases, each pair comprises a public key (e.g., which may be public) and a private key (e.g., which may be kept private). Key pairs may be generated using cryptographic algorithms (e.g., featuring one-way functions). Computing devices may then encrypt a message using an intended receiver's public key such that the encrypted message may be decrypted only with the receiver's corresponding private key. In some embodiments, a message may be used in combination with a private key to create a digital signature on the message. For example, the digital signature may be used to verify the authenticity of blockchain functions or operations. As an illustration, when conducting blockchain functions, the digital signature may be used to prove to every node in the system that it is authorized to conduct the blockchain functions.

For example, system 700 may comprise a plurality of nodes for the blockchain network. A node for a blockchain network may comprise an application or other software that records and/or monitors peer connections to other nodes and/or miners for the blockchain network. For example, a miner comprises a node in a blockchain network that facilitates blockchain functions by verifying blockchain functions or operations on the blockchain, adding new blocks to the existing chain, and/or ensuring that these additions are accurate. The nodes may continually record the state of the blockchain and respond to remote procedure requests for information about the blockchain.

Following an authentication of the blockchain function, the blockchain function may be authorized. For example, after the blockchain function is authenticated between the users, system 700 may authorize the blockchain function prior to adding it to the blockchain. Blockchain function or operations may be added to blockchain 508 via blockchain nodes. The blockchain may perform this (via blockchain nodes) based on a consensus within the blockchain network. For example, system 700 may rely on a majority (or other metric) of the nodes in the community network to determine that the blockchain function or operation is valid. In response to validation of the block, a blockchain node in the community network (e.g., a miner) may receive a reward (e.g., in a given cryptocurrency) as an incentive for validating the block.

To validate the blockchain function, a blockchain node may use one or more validation protocols and/or validation (or consensus) mechanisms. For example, a blockchain node may use a Proof of Work (POW) mechanism in which a user device must provide evidence that it performed computational work to validate a blockchain function, and thus this mechanism provides for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, a blockchain node may use a Proof of Stake (POS) mechanism in which a user account (e.g., corresponding to a node on the blockchain network) is required to have, or "stake," a predetermined amount of tokens in order to be recognized as a validator in the blockchain network. In response to validation of the block, the block is added to blockchain 708, and the blockchain function is completed. For example, to add the blockchain function to blockchain 708, the successful node (e.g., the successful miner) encapsulates the blockchain function in a new block before committing it to the blockchain.

Figure 8:
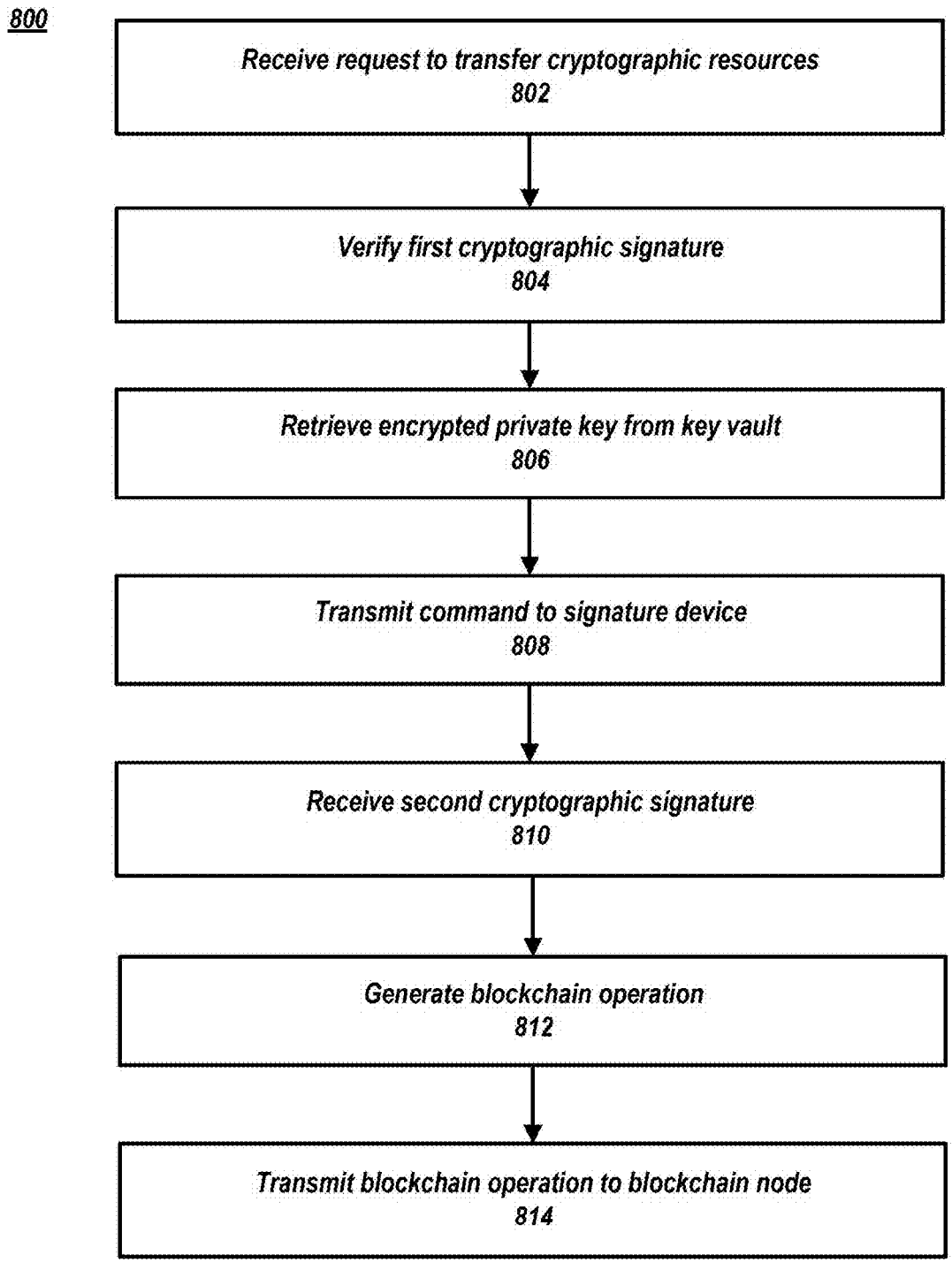
FIG. 8 illustrates a flowchart of a process for transferring cryptographic resources, in accordance with example embodiments.

FIG. 8 illustrates a flowchart of process 800 for transferring cryptographic resources, with a focus on the operations performed by resource transfer system 102.

At 802, resource transfer system 102 receives a request to transfer cryptographic resources. This step involves the network interface 640 of resource transfer system 102, as shown in FIG. 6, which facilitates the receipt of external data. The request may originate from one of the user devices 702, 704, or 706 depicted in FIG. 7. In 804, resource transfer system 102 performs verification of a first cryptographic signature. This verification is executed by the processors 610a-610n (FIG. 6) within resource transfer system 102. During this step, resource transfer system 102 may interact with the blockchain network shown in FIG. 7, specifically by communicating with blockchain nodes to validate the signature.

Moving to 806, resource transfer system 102 retrieves an encrypted private key from a key vault. This operation involves the processors 610a-610n accessing system memory 620 (FIG. 6) where the key vault data may be stored. At 808, resource transfer system 102 transmits a command to a signature device. This transmission is facilitated by the network interface 640 (FIG. 6) of resource transfer system 102. In 810, resource transfer system 102 receives a second cryptographic signature. This reception occurs through the network interface 640 (FIG. 6) of resource transfer system 102. Proceeding to 812, resource transfer system 102 generates a blockchain operation. This generation process is performed by the processors 610a-610n (FIG. 6) within resource transfer system 102. The blockchain operation is structured to be compatible with the blockchain 708 shown in FIG. 7.

Finally, at 814, resource transfer system 102 transmits the blockchain operation to a blockchain node. This transmission is carried out using the network interface 640 (FIG. 6) of resource transfer system 102. The blockchain node receiving this operation would be one of the nodes in the blockchain network depicted in FIG. 7, responsible for adding the operation to blockchain 708. Throughout this process, resource transfer system 102 utilizes its various components shown in FIG. 6, including processors 610a-610n, system memory 620, and network interface 640, to interact with the blockchain environment illustrated in FIG. 7. This interaction enables the secure transfer of cryptographic resources within the decentralized blockchain network.

FIG. 9 illustrates a flowchart of process 900 performed by resource transfer system 102, demonstrating the systematic approach for controlling access to cryptographic resources using double encryption.

At 902, resource transfer system 102 receives a request to transfer cryptographic resources. This involves communication subsystem 112 of resource transfer system 102, which utilizes network interface 640 as shown in FIG. 6 to facilitate the receipt of request 200 via network 150. In 904, resource transfer system 102 retrieves an encrypted key object from a key vault. This step involves signature generation subsystem 116 working in conjunction with processors 610a-610n and system memory 620 from FIG. 6 to access data node 104. The signature generation subsystem 116 queries the key vault using a user identifier to locate the encrypted key object that represents the private key associated with the first user.

At 906, resource transfer system 102 transmits a decryption command to a first security device. Communication subsystem 112 utilizes network interface 640 and I/O interface 650 from FIG. 6 to send the encrypted key object to the first security device, such as a hardware security module (HSM). The first security device processes the decryption command using its specialized cryptographic capabilities to decrypt the encrypted key object into a plurality of encrypted key shards. At 908, resource transfer system 102 receives encrypted key shards from the first security device. Communication subsystem 112 employs network interface 640 from FIG. 6 to receive the plurality of encrypted key shards that represent the private key. These encrypted key shards maintain their encryption from the second layer of the double encryption scheme while having been decrypted from the first layer by the HSM.

At 910, resource transfer system 102 transmits the key shards to a second security device. Signature generation subsystem 116 coordinates with communication subsystem 112, utilizing processors 610a-610n and network interface 640 from FIG. 6, to send the plurality of encrypted key shards along with a command to generate a cryptographic signature to the second security device, such as a multi-party computation (MPC) system. The second security device distributes each encrypted key shard to corresponding nodes for decryption and partial signature generation. At 912, resource transfer system 102 generates a blockchain operation with cryptographic signature. Blockchain operation subsystem 118 works with processors 610a-610n and system memory 620 from FIG. 6 to create blockchain operation 500 based on the original request and the cryptographic signature received from the second security device. This blockchain operation is formatted according to the specific protocol requirements of the target blockchain network shown in FIG. 7, incorporating the cryptographic signature that will be used by blockchain nodes for authorization.

At 914, resource transfer system 102 transmits the blockchain operation to a blockchain node. Communication subsystem 112 utilizes network interface 640 from FIG. 6 to send the completed blockchain operation to blockchain 708 via the blockchain network depicted in FIG. 7. The blockchain nodes in system 700 will validate the blockchain operation using consensus mechanisms such as Proof of Work or Proof of Stake before adding the operation to the blockchain, completing the cryptographic resource transfer process.

Figure 10:
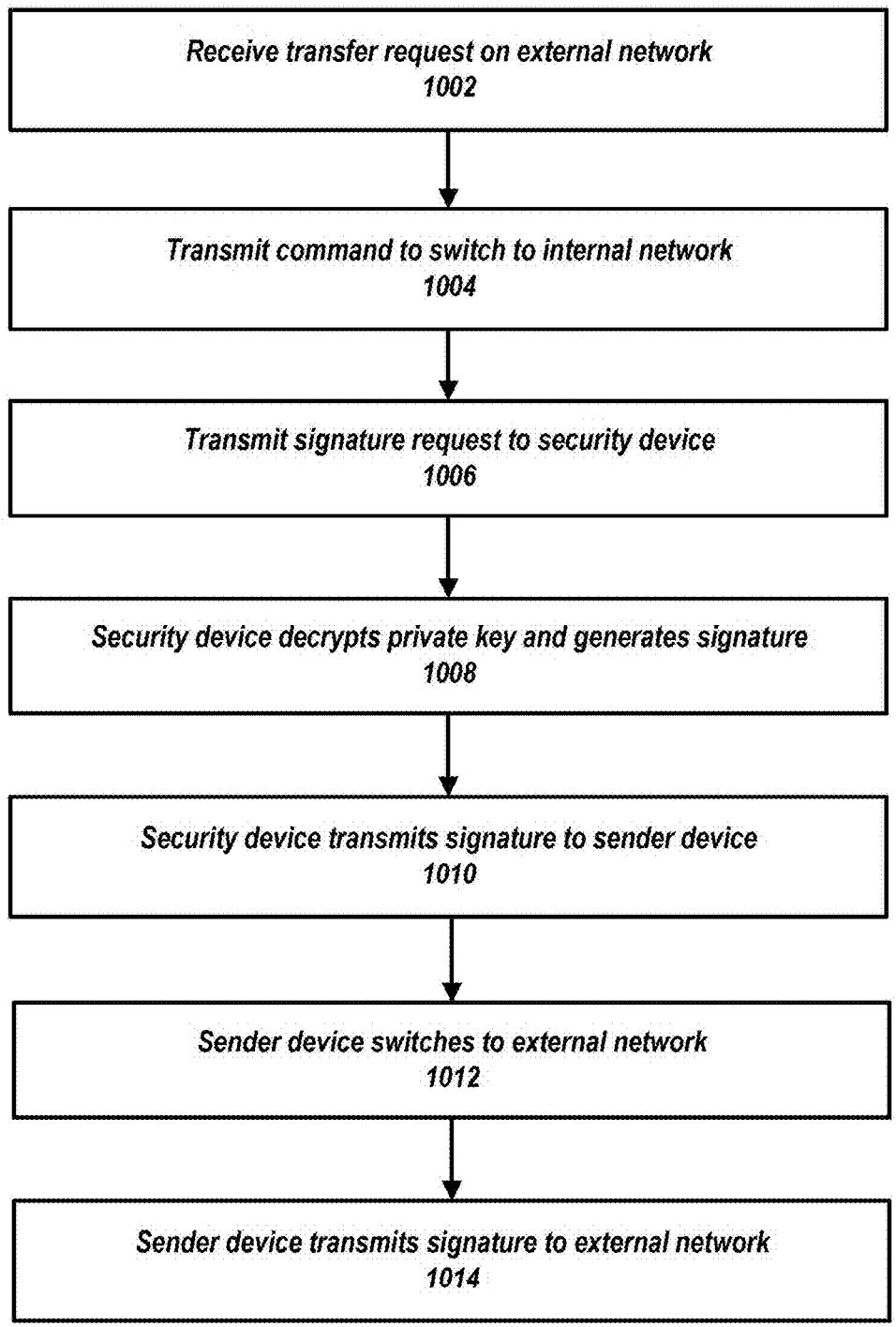
FIG. 10 illustrates a flowchart for controlling access to cryptographic resources using cold storage, in accordance with example embodiments.

FIG. 10 illustrates a flowchart 1000 for processing transfer requests, with a focus on the actions of resource transfer system 102. At 1002, resource transfer system 102 receives a transfer request on an external network. This involves network interface 640 of computing system 600, as shown in FIG. 6, which facilitates the receipt of external data. The transfer request may originate from server device 702 in FIG. 7, potentially utilizing a digital wallet application to initiate a blockchain transaction.

At 1004, resource transfer system 102 transmits a command to switch to an internal network. This operation may be executed by processors 610a-610n (FIG. 6) sending instructions to a secure bypass switch, such as secure bypass switch 429 in FIG. 4B. This switching process ensures isolation between the external blockchain environment depicted in FIG. 7 and the secure internal network.

At 1006, resource transfer system 102 transmits a signature request to a security device. This step involves the internal network components, likely utilizing I/O interface 650 (FIG. 6) to communicate with the security device. The signature request relates to the blockchain operation initiated in the environment shown in FIG. 7 but occurs in the isolated internal network for enhanced security. At 1008, the security device decrypts a private key and generates a signature. While this action is performed by the security device, resource transfer system 102 may utilize its system memory 620 (FIG. 6) to temporarily store related data. This step is crucial for authorizing the blockchain function within the network depicted in FIG. 7, though executed in a secure, isolated environment.

At 1010, the security device transmits the signature to a sender device. Resource transfer system 102 facilitates this transfer within the internal network, likely using components similar to network interface 640 (FIG. 6) but configured for internal communication only. At 1012, the sender device switches to the external network. This step mirrors the earlier network switch, with resource transfer system 102 coordinating the secure transition back to the environment capable of interacting with the blockchain network shown in FIG. 7. Finally, at 1014, the sender device transmits the signature to the external network. Resource transfer system 102 oversees this process, utilizing its network interface 640 (FIG. 6) to ensure the signed transaction is properly broadcast to the blockchain network depicted in FIG. 7, where it can be validated by nodes such as user devices 704 and 706, and potentially added to blockchain 708 by a miner.

Figure 11:
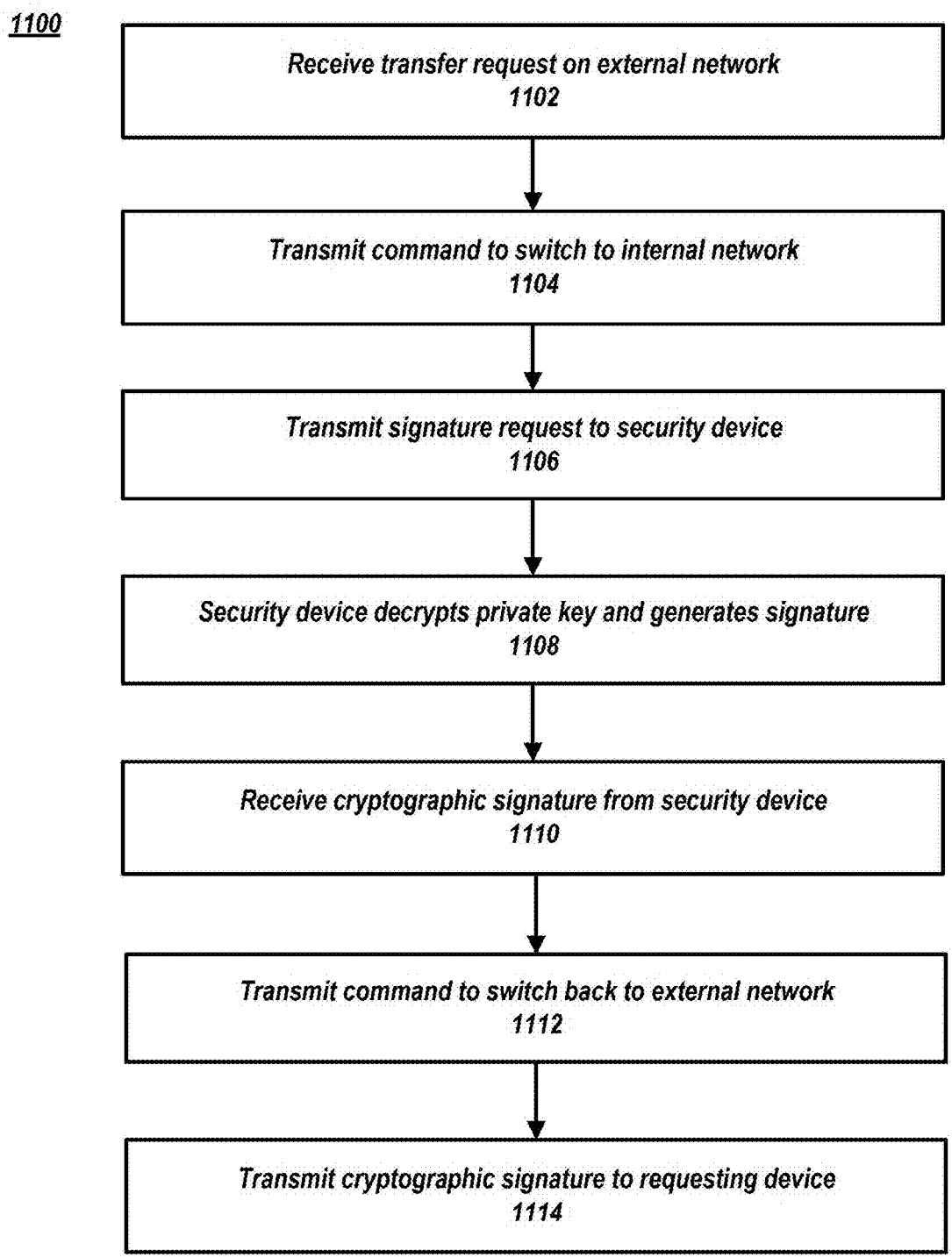
FIG. 11 illustrates another flowchart for controlling access to cryptographic resources using cold storage, in accordance with example embodiments.

FIG. 11 illustrates a flowchart of process 1100 for transferring cryptographic resources. At 1102, resource transfer system 102 receives a transfer request on an external network. This step involves the network interface 640 of computing system 600, as shown in FIG. 6, which facilitates the receipt of external data. The transfer request may originate from a server device such as server device 702 in FIG. 7, potentially utilizing a digital wallet application to initiate a blockchain transaction. At 1104, resource transfer system 102 transmits a command to switch to an internal network. This operation may be executed by processors 610a-610n (FIG. 6) sending instructions to a secure bypass switch, similar to secure bypass switch 429 in FIG. 4B. This switching process ensures isolation between the external blockchain environment depicted in FIG. 7 and the secure internal network.

At 1106, resource transfer system 102 transmits a signature request to a security device. This may involve the internal network components, such as I/O interface 650 (FIG. 6) to communicate with the security device. The signature request relates to the blockchain operation initiated in the environment shown in FIG. 7 but may occur in the isolated internal network for enhanced security. At 1108, the security device decrypts a private key and generates a signature. While this action is performed by the security device, resource transfer system 102 may utilize its system memory 620 (FIG. 6) to temporarily store related data. This may be required for authorizing the blockchain function within the network depicted in FIG. 7, though executed in a secure, isolated environment.

At 1110, resource transfer system 102 receives a cryptographic signature from the security device. This likely involves internal communication components similar to network interface 640 (FIG. 6) but configured for internal network use only. At 1112, resource transfer system 102 transmits a command to switch back to the external network. This may mirror the earlier network switch at 1104, with resource transfer system 102 coordinating the secure transition back to the environment capable of interacting with the blockchain network shown in FIG. 7. Finally, at 1114, resource transfer system 102 transmits the cryptographic signature to a requesting device. Resource transfer system 102 oversees this process, utilizing its network interface 640 (FIG. 6) to ensure the signed transaction is properly broadcast to the blockchain network depicted in FIG. 7, where it can be validated by nodes such as user devices 704 and 706, and potentially added to blockchain 708 by a miner.

The following examples pertain to further embodiments for controlling access to cryptographic resources.

1. A method comprising: receiving a request to transfer control of a first number of cryptographic resources from a first user to a second user; retrieving, from a key vault using a user identifier associated with the first user, an encrypted private key associated with the first user, and wherein the encrypted private key, when decrypted, is used to generate a second cryptographic signature for a blockchain operation to transfer control of the first number of cryptographic resources to be controlled by the second user; transmitting, to a signature device, a command to cryptographically sign the request, wherein the signature device generates the second cryptographic signature for the blockchain operation, and wherein the command comprises the encrypted private key; receiving, from the signature device, the second cryptographic signature generated based on the encrypted private key, wherein the signature device decrypts the encrypted private key using a decryption key corresponding to the encrypted private key; generating the blockchain operation based on the request and the second cryptographic signature, wherein the second cryptographic signature is used by a blockchain node of a blockchain to authorize the blockchain operation; and transmitting the blockchain operation to the blockchain node.

2. The method of any of claim 1, wherein the command is transmitted over a private network to the signature device, wherein the private network is inaccessible by devices not involved in authorizing requests.

3. The method of any of claims 1-2, further comprising: receiving a new account generation request for a new user;

transmitting a key generation request to the signature device, wherein the signature device generates a new private key and a new public key, and wherein the signature device encrypted the new private key into a new encrypted private key using a new encryption key that is generated on the signature device; receiving the new encrypted private key and the new public key from the signature device; and transmitting the new encrypted private key to a database server, wherein the database server stores the new encrypted private key in the key vault.

4. The method of any of claims 1-3, wherein transmitting the new encrypted private key to the database server further comprises: retrieving user data associated with the new user; determining based on the user data associated with user a user's location, wherein the user's location comprises a jurisdiction of the user; identifying, based on the user's location, the database server within the jurisdiction of the user, wherein the database server is one of a plurality of database servers active in a plurality of different jurisdictions; and transmitting the new encrypted private key to the database server identified based on the jurisdiction corresponding to the user.

5. The method of any of claims 1-4, wherein retrieving, from the key vault using the user identifier, the encrypted private key associated with the first user further comprises: retrieving, from the request, the user identifier associated with the first user; transmitting, to the key vault, the user identifier associated with the first user; and receiving from the key vault, the encrypted private key associated with the first user.

6. The method of any of claims 1-5, wherein the request comprises the user identifier associated with the first user and a first cryptographic signature of a verification engine that verified the request, and wherein the first user controls a first cryptography-based storage application and the second user controls a second cryptography-based storage application.

7. The method of any of claims 1-6, further comprising: retrieving from the blockchain operation a first set of operation parameters associated with the blockchain operation, wherein the first set of operation parameters comprises a resource value, a first identifier corresponding to the first cryptography-based storage application, and a second identifier of the second cryptography-based storage application associated with the second user; comparing the first set of operation parameters with a second set of parameters associated with the request; and based on determining that the first set of operation parameters matching the second set of parameters, validating the blockchain operation.

8. The method of any of claims 1-7, further comprising: determining that the request comprises a second command to transfer control of the first number of cryptographic resources from a first jurisdiction and from a second jurisdiction; determining that the first cryptography-based storage application is associated with the first jurisdiction; identifying, based on the user identifier, that a third cryptography-based storage application is associated with the first user and corresponds to the second jurisdiction; and generating a second blockchain operation to transfer controls of resources from the third cryptography-based storage application to the second cryptography-based storage application.

9. One or more non-transitory, computer-readable storage media storing instructions that when executed by one or more processors cause the one or more processors to perform the method of any of claims 1-8.

10. A system comprising means for performing the method of any of claims 1-8.

The following examples pertain to further embodiments for controlling access to cryptographic resources using double encryption.

1. A method comprising: receiving a request to transfer control of a first number of cryptographic resources from a first user to a second user; retrieving, from a key vault using a user identifier associated with the first user, an encrypted key object that represents a private key, wherein the encrypted key object comprises a plurality of encrypted key shards; transmitting, to a first security device, a decryption command to decrypt the encrypted key object, wherein the first security device decrypts the encrypted key object into the plurality of encrypted key shards; receiving, from the first security device, the plurality of encrypted key shards representing the private key; transmitting, to a second security device, the plurality of encrypted key shards and a command to generate a cryptographic signature for signing a blockchain operation; generating the blockchain operation based on the request and the cryptographic signature, wherein the cryptographic signature is used by a blockchain node of a blockchain to authorize the blockchain operation; and transmitting the blockchain operation to the blockchain node.

2. The method of claim 1, wherein each key shard of the plurality of encrypted key shards, when decrypted, is used to generate a corresponding portion of the cryptographic signature for the blockchain operation to transfer control of the first number of cryptographic resources to be controlled by the second user.

3. The method of any of claims 1-2, wherein the second security device transmits each encrypted key shard of the plurality of encrypted key shards to a corresponding node that encrypted each shard, and wherein each corresponding node generates a corresponding portion of the cryptographic signature corresponding to an encrypted shard of the plurality of encrypted key shards.

4. The method of any of claims 1-3, further comprising: receiving a new account generation request for a new user; transmitting a key generation request to the second security device, wherein the second security device generates a new private key and a new public key for the new user, and wherein the second security device generates the new private key as a new plurality of key shards, sends each new key shard to a corresponding node, wherein each corresponding node encrypts a corresponding new keys shard, each corresponding node generating a new encrypted plurality of key shards using a corresponding first encryption key generated at each node; receiving the new encrypted plurality of key shards and the new public key from the second security device; transmitting the new encrypted plurality of key shards to the first security device with an encryption command to encrypt the new encrypted plurality of key shards into a new encrypted private key, wherein the first security device encrypts the new plurality of key shards into the new encrypted private key using a second encryption key that is generated on the first security device; and transmitting the new encrypted private key to a database server that stores the new encrypted private key in the key vault.

5. The method of any of claims 1-4, wherein transmitting the new encrypted private key to the database server comprises: retrieving user data associated with the new user; determining based on the user data associated with user a user's location, wherein the user's location comprises a jurisdiction of the user; identifying, based on the user's location, the database server within the jurisdiction of the user, wherein the database server is one of a plurality of database servers active in a plurality of different jurisdictions; and transmitting the new encrypted private key to the database server identified based on the jurisdiction corresponding to the user.

6. The method of any of claims 1-5, wherein for retrieving, from the key vault using the user identifier, the encrypted key object associated with the first user further comprises: retrieving, from the request, the user identifier associated with the first user; transmitting, to the key vault, the user identifier associated with the first user; and receiving, from the key vault, the encrypted key object associated with the first user.

7. The method of any of claims 1-6, further comprising: receiving, from the second security device, a plurality of portions of the cryptographic signature generated based on the plurality of encrypted key shards, wherein the cryptographic signature is used to cryptographically sign the blockchain operation; and combining the plurality of portions of the cryptographic signature into the cryptographic signature.

8. A non-transitory computer-readable medium storing instructions that, when executed by one or more processors, cause the one or more processors to perform the method of any of claims 1-7.

9. A non-transitory computer-readable medium storing instructions that, when executed by one or more processors, cause the one or more processors to perform the method of any of claims 1-7.

The following examples pertain to further embodiments for using cold storage to control access to cryptographic resources.

1. A method comprising: receiving, at a computing device while connected to an external network, a transfer request to transfer control of a number of cryptographic resources from a first user to a second user, wherein the transfer request comprises a user identifier and a transaction hash of a blockchain operation, wherein the computing device is coupled to both a security device that stores decryption keys and a secure bypass switch, wherein the secure bypass switch physically switches a network connection of the computing device between the external network and an internal network, and wherein the external network and the internal network are physically prevented from being simultaneously connected to the computing device using an air gap; in response to receiving the transfer request, transmitting a first command to the secure bypass switch to switch the network connection from the external network to the internal network; subsequently to transmitting the first command, transmitting, to the security device on the internal network, a signature request requesting generation of a cryptographic signature for the blockchain operation using the transaction hash and the user identifier, wherein the security device decrypts a private key associated with the user identifier and generates the cryptographic signature using the transaction hash; receiving, from the security device, the cryptographic signature; in response to receiving the cryptographic signature, transmitting a second command to the secure bypass switch to switch the network connection from the internal network to the external network; and transmitting the cryptographic signature to a requesting device.

2. The method of claim 1, further comprising: receiving, while connected to the external network, a new account generation request to generate a new account for a new user; transmitting, to the secure bypass switch, a switching command to connect the computing device to the internal network; in response to connecting to the internal network, transmitting an account generation command to the security device, wherein the new account generation request comprises one or more commands to generate a new private key and a new public key for the new user; and transmitting an indication that the new account has been created, wherein the indication comprises the new public key.

3. The method of any of claims 1-2, wherein transmitting, to the security device, the new account generation request further comprises: generating a shard generation command to generate a plurality of cryptographic key shards using the security device, wherein each cryptographic key shard of the plurality of cryptographic key shards enables generation of a partial cryptographic signature that signs one or more blockchain operations; generating an encryption command that instructs the security device to encrypt each cryptographic key shard of the plurality of cryptographic key shards; and transmitting the shard generation command and the encryption command to the security device, wherein the security device generates the new private key as the plurality of cryptographic key shards and that are encrypted at each node of the security device.

4. The method of any of claims 1-3, wherein the new account generation request comprises an identifier of a blockchain network indicating a type of keys required.

5. The method of any of claims 1-4, wherein the account generation command comprises a request to return the new public key, and wherein the new public key is used to generate a cryptographic address on a corresponding blockchain.

6. The method of any of claims 1-5, wherein the security device is connected to the internal network only and is isolated from other networks.

7. The method of any of claims 1-6, wherein the transfer request comprises an encrypted private key for generating the cryptographic signature, and wherein the security device stores one or more decryption keys for decrypting the encrypted private key.

8. The method of any of claims 1-7, further comprising: extracting, at the computing device, the encrypted private key; and transmitting, to the security device an instruction to sign the blockchain operation using a decrypted instance of the encrypted private key, wherein the security device decrypts the encrypted private key and signs the blockchain operation.

9. A non-transitory computer-readable medium storing instructions that, when executed by one or more processors, cause the one or more processors to perform operations of the method of any of claims 1-8.

10. A system comprising: means for receiving, while connected to an external network, a transfer request to transfer control of a number of cryptographic resources from a first user to a second user, wherein the transfer request comprises a user identifier and a transaction hash of a blockchain operation; means for transmitting a first command to switch a network connection from the external network to an internal network in response to receiving the transfer request; means for transmitting, to a security device on the internal network, a signature request requesting generation of a cryptographic signature for the blockchain operation; means for receiving the cryptographic signature from the security device; means for transmitting a second command to switch the network connection from the internal network to the external network in response to receiving the cryptographic signature; and means for transmitting the cryptographic signature to a requesting device.

The invention claimed is:

1. A system for controlling access to cryptographic resources, the system comprising:
a security device storing encrypted private keys for blockchain operations;
a first secure bypass switch connecting a receiver computing device to an external network or to an internal network and a second secure bypass switch connecting a sender computing device to the external network or to the internal network, wherein each of the first secure bypass switch and the second secure bypass switch physically switch a corresponding network connection of a corresponding computing device between the external network and the internal network, and wherein the external network and the internal network are physically prevented from being simultaneously connected to each computing device using an air gap; and
the receiver computing device coupled to the security device and the first secure bypass switch, the receiver computing device comprising one or more processors and one or more non-transitory computer-readable storage media storing instructions, which when executed by the one or more processors cause the one or more processors to perform operations comprising:
receiving, while connected to the external network, a transfer request to transfer control of a number of cryptographic resources from a first user to a second user, wherein the transfer request comprises a user identifier and a hash of a blockchain operation;
in response to receiving the transfer request, transmitting a first command to the first secure bypass switch to switch from the external network to the internal network; and
subsequently to transmitting the first command, transmitting, to the security device on the internal network, a signature request requesting generation of a cryptographic signature for the blockchain operation using the hash and the user identifier, wherein the first command instructs the security device to (1) decrypt a private key associated with the user identifier and generate the cryptographic signature using the hash and (2) transmit the cryptographic signature to the sender computing device, and wherein the sender computing device instructs the second secure bypass switch to switch the corresponding network connection from the internal network to the external network and transmits the cryptographic signature to the external network.

2. The system of claim 1, wherein the instructions further cause the one or more processors to perform operations comprising:
receiving, while connected to the external network, a new account generation request to generate a new account for a new user;
transmitting, to the first secure bypass switch, a switching command to connect the receiver computing device to the internal network;
in response to connecting to the internal network, transmitting an account generation command to the security device, wherein the new account generation request comprises one or more commands to generate a new private key and a new public key for the new user; and
causing a generation of an indication that the new account has been created, wherein the indication comprises the new public key.

3. The system of claim 2, wherein the instructions for transmitting, to the security device, the new account generation request further comprises:
generating a shard generation command to generate a plurality of cryptographic key shards using the security device, wherein each cryptographic key shard of the plurality of cryptographic key shards enables generation of a partial cryptographic signature that signs one ro more blockchain operations;
generating an encryption command that instructs the security device to encrypt each cryptographic key shard of the plurality of cryptographic key shards; and
transmitting the shard generation command and the encryption command to the security device, wherein the security device generates the new private key comprising the plurality of cryptographic key shards and encrypts each cryptographic key shard.

4. The system of claim 2, wherein the new account generation request comprises an identifier of a blockchain network indicating a type of keys required.

5. The system of claim 2, wherein the account generation command comprises a request to return the new public key, and wherein the new public key is used to generate a cryptographic address on a corresponding blockchain.

6. The system of claim 1, wherein the security device is connected to the internal network only and is isolated from other networks.

7. A method for controlling access to cryptographic resources using offline storage, the method comprising:
receiving, at a computing device while connected to an external network, a transfer request to transfer control of a number of cryptographic resources from a first user to a second user, wherein the transfer request comprises a user identifier and a transaction hash of a blockchain operation, wherein the computing device is coupled to both a security device that stores decryption keys and a secure bypass switch, wherein the secure bypass switch physically switches a network connection of the computing device between the external network and an internal network, and wherein the external network and the internal network are physically prevented from being simultaneously connected to the computing device using an air gap;
in response to receiving the transfer request, transmitting a first command to the secure bypass switch to switch the network connection from the external network to the internal network;
subsequently to transmitting the first command, transmitting, to the security device on the internal network, a signature request requesting generation of a cryptographic signature for the blockchain operation using the transaction hash and the user identifier, wherein the security device decrypts a private key associated with the user identifier and generates the cryptographic signature using the transaction hash;
receiving, from the security device, the cryptographic signature;
in response to receiving the cryptographic signature, transmitting a second command to the secure bypass switch to switch the network connection from the internal network to the external network; and
transmitting the cryptographic signature to a requesting device.

8. The method of claim 7, further comprising:
receiving, while connected to the external network, a new account generation request to generate a new account for a new user;

transmitting, to the secure bypass switch, a switching command to connect the computing device to the internal network;

in response to connecting to the internal network, transmitting an account generation command to the security device, wherein the new account generation request comprises one or more commands to generate a new private key and a new public key for the new user; and transmitting an indication that the new account has been created, wherein the indication comprises the new public key.

9. The method of claim 8, wherein transmitting, to the security device, the new account generation request further comprises:

generating a shard generation command to generate a plurality of cryptographic key shards using the security device, wherein each cryptographic key shard of the plurality of cryptographic key shards enables generation of a partial cryptographic signature that signs one or more blockchain operations;

generating an encryption command that instructs the security device to encrypt each cryptographic key shard of the plurality of cryptographic key shards; and transmitting the shard generation command and the encryption command to the security device, wherein the security device generates the new private key comprising the plurality of cryptographic key shards and encrypts each cryptographic key shard.

10. The method of claim 8, wherein the new account generation request comprises an identifier of a blockchain network indicating a type of keys required.

11. The method of claim 8, wherein the account generation command comprises a request to return the new public key, and wherein the new public key is used to generate a cryptographic address on a corresponding blockchain.

12. The method of claim 7, wherein the security device is connected to the internal network only and is isolated from other networks.

13. The method of claim 7, wherein the transfer request comprises an encrypted private key for generating the cryptographic signature, and wherein the security device stores one or more decryption keys for decrypting the encrypted private key.

14. The method of claim 13, further comprising:

extracting, at the computing device, the encrypted private key; and transmitting, to the security device an instruction to sign the blockchain operation using a decrypted instance of the encrypted private key, wherein the security device decrypts the encrypted private key and signs the blockchain operation.

15. One or more non-transitory, computer-readable storage media storing instructions that when executed by one or more processors cause the one or more processors to perform operations comprising:

receiving, at a computing device while connected to an external network, a transfer request to transfer control of a number of cryptographic resources from a first user to a second user, wherein the computing device is coupled to both a security device and a secure bypass switch, wherein the secure bypass switch physically switches a network connection of the computing device between the external network and an internal network, and wherein the external network and the internal network are physically prevented from being simultaneously connected to the computing device using an air gap;

in response to receiving the transfer request, transmitting a first command to the secure bypass switch to switch the network connection from the external network to the internal network;

subsequently to transmitting the first command, transmitting, to the security device on the internal network, a signature request requesting generation of a cryptographic signature for a blockchain operation, wherein the security device decrypts a private key associated with the first user and generates the cryptographic signature;

receiving, from the security device, the cryptographic signature;

in response to receiving the cryptographic signature, transmitting a second command to the secure bypass switch to switch the network connection from the internal network to the external network; and transmitting the cryptographic signature to a requesting device.

16. The one or more non-transitory, computer-readable storage media of claim 15, wherein the instructions further cause the one or more processors to perform operations comprising:

receiving, while connected to the external network, a new account generation request to generate a new account for a new user;

transmitting, to the secure bypass switch, a switching command to connect the computing device to the internal network;

in response to connecting to the internal network, transmitting an account generation command to the security device, wherein the new account generation request comprises one or more commands to generate a new private key and a new public key for the new user; and transmitting an indication that the new account has been created, wherein the indication comprises the new public key.

17. The one or more non-transitory, computer-readable storage media of claim 16, wherein the instructions further cause the one or more processors to perform operations comprising:

generating a shard generation command to generate a plurality of cryptographic key shards using the security device, wherein each cryptographic key shard of the plurality of cryptographic key shards enables generation of a partial cryptographic signature that signs one ro more blockchain operations;

generating an encryption command that instructs the security device to encrypt each cryptographic key shard of the plurality of cryptographic key shards; and transmitting the shard generation command and the encryption command to the security device, wherein the security device generates the new private key comprising the plurality of cryptographic key shards and encrypts each cryptographic key shard.

18. The one or more non-transitory, computer-readable storage media of claim 16, wherein the new account generation request comprises an identifier of a blockchain network indicating a type of keys required.

19. The one or more non-transitory, computer-readable storage media of claim 16, wherein the account generation command comprises a request to return the new public key, and wherein the new public key is used to generate a cryptographic address on a corresponding blockchain.

20. The one or more non-transitory, computer-readable storage media of claim 15, wherein the security device is connected to the internal network only and is isolated from other networks.

* * * * *